(12) United States Patent
Qiao et al.

(10) Patent No.: US 12,718,475 B2
(45) Date of Patent: Aug. 25, 2026

(54) SITE MODEL UPDATING METHOD AND SYSTEM

(71) Applicant: HUAWEI TECHNOLOGIES CO., LTD., Shenzhen (CN)

(72) Inventors: Jian Qiao, Shanghai (CN); Shan Huang, Wuhan (CN); Kai Tan, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 347 days.

(21) Appl. No.: 18/336,101

(22) Filed: Jun. 16, 2023

(65) Prior Publication Data

US 2023/0334774 A1 Oct. 19, 2023

Related U.S. Application Data

(63) Continuation of application No. PCT/CN2021/134154, filed on Nov. 29, 2021.

(30) Foreign Application Priority Data

Dec. 16, 2020 (CN) ........................ 202011487305.1

(51) Int. Cl.

| | |
|---|---|
| ***G06T 17/00*** | (2006.01) |
| ***G06T 7/246*** | (2017.01) |
| ***G06T 7/73*** | (2017.01) |
| ***H04N 5/262*** | (2006.01) |

(Continued)

(52) U.S. Cl.

CPC .............. *G06T 17/00* (2013.01); *G06T 7/248* (2017.01); *G06T 7/74* (2017.01); *H04N 5/2628* (2013.01); *H04N 7/183* (2013.01); *H04N 23/80* (2023.01); *G06T 2207/20081* (2013.01); *G06T 2207/20084* (2013.01); *G06T 2207/30232* (2013.01); *G06T 2207/30244* (2013.01)

(58) Field of Classification Search

None

See application file for complete search history.

(56) References Cited

U.S. PATENT DOCUMENTS 11,468,285 B1 * 10/2022 Tang .................... G06V 10/255
2001/0043738 A1 * 11/2001 Sawhney ................ G06T 15/20 382/154
2007/0065002 A1 3/2007 Marzell et al.

(Continued)

FOREIGN PATENT DOCUMENTS

CN 103702071 A 4/2014
CN 102932638 B 12/2014

(Continued)

*Primary Examiner* — Yanna Wu

(57) ABSTRACT

This application discloses a site model updating method and system in the field of artificial intelligence. The method includes: obtaining a surveillance image; determining, based on the obtained surveillance image, a change type of a device that changes and a change amount corresponding to the change type; calculating a pose and camera parameter of the surveillance image based on the surveillance image and a site model; determining, based on the pose and camera parameter of the surveillance image, a pose of the device that changes; and updating the site model based on the pose of the device that changes, the change type, and the change amount corresponding to the change type.

20 Claims, 9 Drawing Sheets

(51) Int. Cl.
*H04N 7/18* (2006.01)
*H04N 23/80* (2023.01)

(56) References Cited

U.S. PATENT DOCUMENTS

| | | | | |
|---|---|---|---|---|
| 2020/0074743 | A1* | 3/2020 | Zheng | G01P 13/00 |
| 2021/0357659 | A1* | 11/2021 | Aomi | G06T 7/292 |

FOREIGN PATENT DOCUMENTS

| | | | |
|---|---|---|---|
| CN | 105141912 | A | 12/2015 |
| CN | 110473259 | A | 11/2019 |
| CN | 111462316 | A | 7/2020 |
| JP | 2002051156 | A | 2/2002 |

* cited by examiner

SITE MODEL UPDATING METHOD AND SYSTEM

CROSS-REFERENCE TO RELATED APPLICATIONS

This application is a continuation of International Patent Application No. PCT/CN2021/134154, filed on Nov. 29, 2021, which claims priority to Chinese Patent Application No. 202011487305.1, filed on Dec. 16, 2020. The disclosures of the aforementioned applications are hereby incorporated by reference in their entireties.

TECHNICAL FIELD

This application relates to the field of artificial intelligence, and more specifically, to a site model updating method and system.

BACKGROUND

In a plurality of application scenarios, a site model needs to be built and updated for a site at a location, to provide data support for links of the site such as design and hardware installation, and improve design efficiency and asset management. In addition, based on an actual change at the site, a decision-making guidance or a safety warning may also be provided. For example, the actual change at the site may include a change in position or orientation of a key device or even device damage, resulting in a safety or system performance problem, and requiring a timely measure. A meaning of the site is determined based on an application scenario. For example, in an application scenario of telecommunication, the site may be understood as a network base station, relay station, or communication hub related to network deployment and integration services. For another example, in an application scenario of security and surveillance in a smart city, the site may be understood as a traffic indication system. For another example, in an application scenario of power transmission, the site may be understood as a photovoltaic power generation system, a relay power station, or a power transmission hub. For another example, in an application scenario of a petroleum industry, the site may be understood as a gas station or an oil refinery. In these application scenarios, an actual change at a site needs to be monitored, monitoring data of a site also needs to be collected in real time, whether a key device changes needs to be determined, and a site model needs to be timely updated. In the conventional technology, data is usually collected in a manual site visit manner, to discover an actual change at a site and update a site model accordingly. However, the manual site visit manner not only has drawbacks of manpower consumption and high costs, but also encounters failure to timely collect monitoring data of a site and update a site model due to frequent failures in timely arranging for a person to visit a site.

Therefore, a technical solution is needed to implement real-time monitoring of an actual change at a site, automatic determining of whether a key device changes, and updating of a site model.

SUMMARY

In embodiments of this application, to resolve technical difficulties of monitoring an actual change at a site in real time, automatically determining whether a key device changes, and updating a site model, a device that changes and a change type are automatically recognized with reference to a monocular photographic technology and a deep learning algorithm, thereby implementing automatic detection of a site change, collection of site data, and timely updating of a site model.

According to a first aspect, an embodiment of this application provides a site model updating method. The method includes: obtaining a surveillance image, and determining, based on the obtained surveillance image, a change type of a device that changes and a change amount corresponding to the change type; calculating a pose and camera parameter of the surveillance image based on the surveillance image and a site model; determining, based on the pose and camera parameter of the surveillance image, a pose of the device that changes; and updating the site model based on the pose of the device that changes, the change type, and the change amount corresponding to the change type.

According to a technical solution described in the first aspect, whether there is a device that changes in a surveillance image is automatically determined, and a change type of the device that changes and a corresponding change amount are further determined based on a plurality of preset change types, thereby implementing automatic detection of a site change, collection of site data, and timely updating of a site model.

According to the first aspect, in an implementation, the method includes: inputting the surveillance image into a neural network model, to determine the change type of the device that changes and the change amount corresponding to the change type, where the change type is one of a plurality of preset change types.

According to the first aspect, in an implementation, the neural network model is obtained through training by using a loss function. The loss function includes a weighted sum of a plurality of loss subfunctions. The plurality of loss subfunctions are in a one-to-one correspondence with the plurality of preset change types. Each of the plurality of loss subfunctions is determined based on a change amount corresponding to a preset change type that corresponds to the loss subfunction. In this way, with the surveillance image input into the neural network model and different loss subfunctions separately designed, the neural network model is trained to perform a plurality of tasks, including quickly determining a change type and a corresponding change amount.

According to the first aspect, in an implementation, the plurality of preset change types include device addition, and a change amount corresponding to device addition includes a maximum value of pixel dimensions of a surveillance image. In this way, whether a change type is device addition and a corresponding change amount are quickly determined.

According to the first aspect, in an implementation, the plurality of preset change types include device deletion, and a change amount corresponding to device deletion includes a negative value of a maximum value of pixel dimensions of a surveillance image. In this way, whether a change type is device deletion and a corresponding change amount are quickly determined.

According to the first aspect, in an implementation, the plurality of preset change types include device movement, and a change amount corresponding to device movement includes a moving distance of a center point of the device that changes. In this way, whether a change type is device movement and a corresponding change amount are quickly determined.

According to the first aspect, in an implementation, the plurality of preset change types include device rotation, and a change amount corresponding to device rotation includes a turning distance of a connection line between an edge and a center point of the device that changes. In this way, whether a change type is device rotation and a corresponding change amount are quickly determined.

According to the first aspect, in an implementation, the plurality of preset change types include simultaneous device movement and rotation, and a change amount corresponding to simultaneous device movement and rotation includes a moving distance of a center point of the device that changes and a turning distance of a connection line between an edge and the center point of the device that changes. In this way, whether a change type is simultaneous device movement and rotation and a corresponding change amount are quickly determined.

According to the first aspect, in an implementation, the method further includes: determining a proportion of an area in which the device that changes is located in the surveillance image; comparing the proportion with a preset proportion; when the proportion is less than the preset proportion, obtaining a magnified surveillance image; calculating a pose and camera parameter of the magnified surveillance image based on the magnified surveillance image and the site model; and updating the site model based on the pose and camera parameter of the magnified surveillance image. In this way, the magnified surveillance image is obtained; the pose and camera parameter of the magnified surveillance image are calculated based on the magnified surveillance image and the site model; and the site model is updated based on the pose and camera parameter of the magnified surveillance image.

According to the first aspect, in an implementation, the magnified surveillance image is obtained based on a magnification factor, where the magnification factor is determined based on the proportion and the preset proportion. In this way, the magnification factor is calculated.

According to the first aspect, in an implementation, the pose and camera parameter of the magnified surveillance image are determined based on the magnification factor and the pose and camera parameter of the surveillance image. In this way, the pose and camera parameter of the magnified surveillance image are calculated.

According to a second aspect, an embodiment of this application provides a chip system. The chip system is used in an electronic device. The chip system includes one or more interface circuits and one or more processors. The interface circuit and the processor are interconnected by using a line. The interface circuit is configured to receive a signal from a memory in the electronic device, and send a signal to the processor, where the signal includes computer instructions stored in the memory. When the processor executes the computer instructions, the electronic device performs the method according to any one of the items in the first aspect.

According to a technical solution described in the second aspect, whether there is a device that changes in a surveillance image is automatically determined, and a change type of the device that changes and a corresponding change amount are further determined based on a plurality of preset change types, thereby implementing automatic detection of a site change, collection of site data, and timely updating of a site model.

According to a third aspect, an embodiment of this application provides a computer-readable storage medium. The computer-readable storage medium stores computer program instructions. When the computer program instructions are executed by a processor, the processor is enabled to perform the method according to any one of the implementations in the first aspect.

According to a technical solution described in the third aspect, whether there is a device that changes in a surveillance image is automatically determined, and a change type of the device that changes and a corresponding change amount are further determined based on a plurality of preset change types, thereby implementing automatic detection of a site change, collection of site data, and timely updating of a site model.

According to a fourth aspect, an embodiment of this application provides a computer program product. The computer program product includes computer instructions. When the computer instructions are run on an electronic device, the electronic device is enabled to perform the method according to any one of the implementations in the first aspect.

According to a technical solution described in the fourth aspect, whether there is a device that changes in a surveillance image is automatically determined, and a change type of the device that changes and a corresponding change amount are further determined based on a plurality of preset change types, thereby implementing automatic detection of a site change, collection of site data, and timely updating of a site model.

According to a fifth aspect, an embodiment of this application provides a site model updating system. The system includes a device change detection apparatus and a processor. The device change detection apparatus determines, based on a surveillance image, a change type of a device that changes and a change amount corresponding to the change type. The processor is configured to: obtain the surveillance image; calculate a pose and camera parameter of the surveillance image based on the surveillance image and a site model; determine, based on the pose and camera parameter of the surveillance image, a pose of the device that changes; and update the site model based on the pose of the device that changes, the change type, and the change amount corresponding to the change type.

According to a technical solution described in the fifth aspect, whether there is a device that changes in a surveillance image is automatically determined, and a change type of the device that changes and a corresponding change amount are further determined based on a plurality of preset change types, thereby implementing automatic detection of a site change, collection of site data, and timely updating of a site model.

According to a sixth aspect, an embodiment of this application provides a photovoltaic power generation system. The photovoltaic power generation system includes a site model updating system, configured to perform the method according to any one of the implementations in the first aspect. The photovoltaic power generation system monitors a change in the photovoltaic power generation system by using the site model updating system. A site corresponds to the photovoltaic power generation system.

According to a seventh aspect, an embodiment of this application provides a communication transit system. The communication transit system includes a site model updating system, configured to perform the method according to any one of the implementations in the first aspect. The communication transit system monitors a change in the communication transit system by using the site model updating system. A site corresponds to the communication transit system.

BRIEF DESCRIPTION OF DRAWINGS

The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
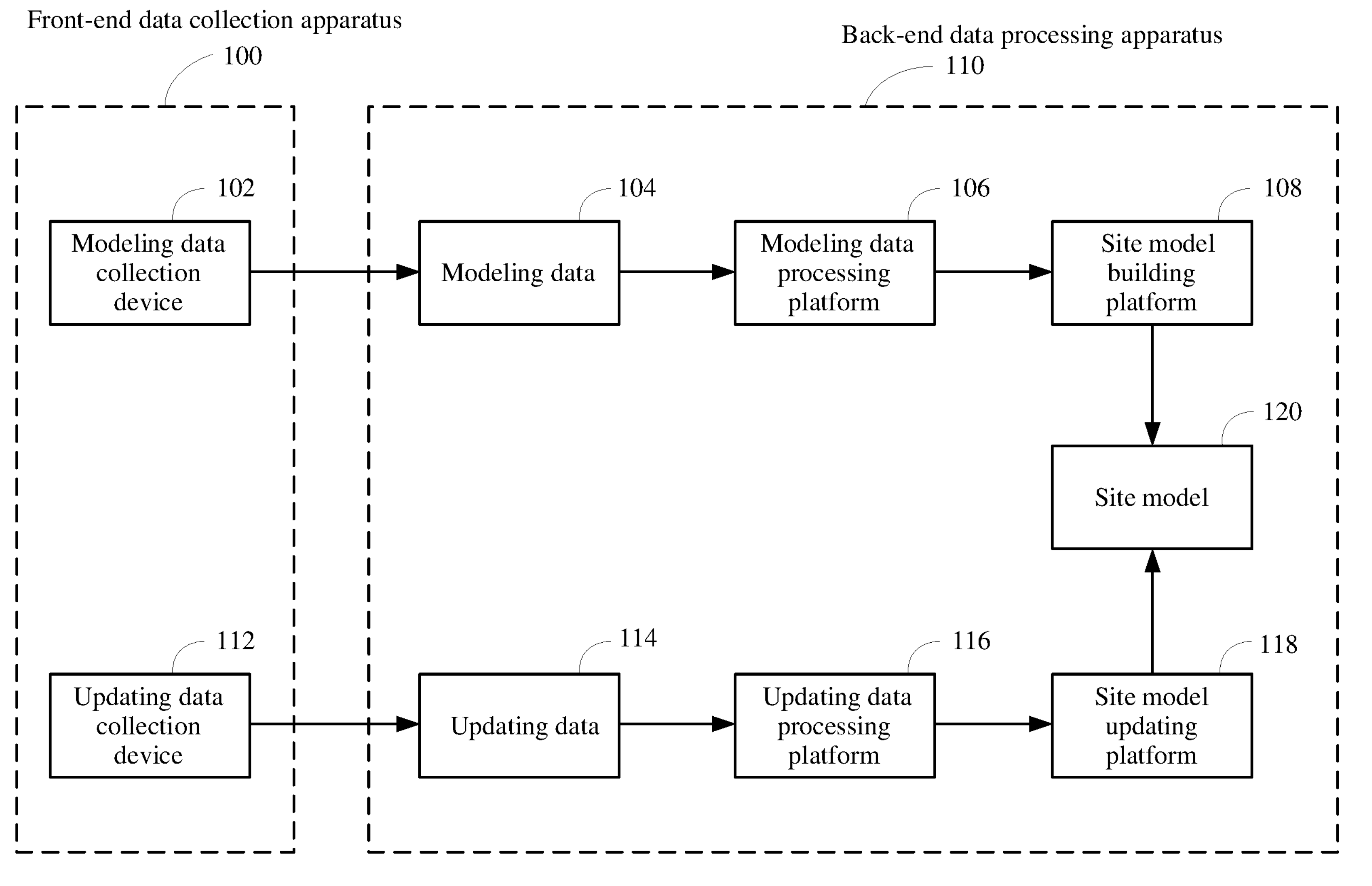
FIG. 1 is a diagram of a structure of a site model building and updating system according to an embodiment of this application.

In embodiments of this application, to resolve a difficulty that a person needs to visit a site to collect data, a device that changes and a change type are automatically recognized with reference to a photographic technology and a deep learning algorithm, thereby implementing automatic detection of a site change, collection of site data, and timely updating of a three-dimensional model of a site.

The following describes some terms and techniques used in embodiments of this application.

Artificial intelligence (AI): Artificial intelligence is a theory, method, technology, and application system that simulates, extends, and expands human intelligence, perceives an environment, obtains knowledge, and uses knowledge to obtain a best result by using a digital computer or a machine controlled by a digital computer. In other words, artificial intelligence is a branch of computer science, and attempts to understand essence of intelligence and produce a new intelligent machine capable of reacting in a manner similar to human intelligence. Artificial intelligence is to study design principles and implementation methods of various intelligent machines, to enable the machines to have functions of perceiving, inferring, and decision-making. Research in the field of artificial intelligence includes a robot, natural language processing, computer vision, decision-making and inference, man-machine interaction, recommendation and searching, a basic theory of AI, and the like.

Neural network (NN): As an important branch of artificial intelligence, a neural network is a network structure that imitates a behavioral feature of a neural network of an animal for information processing. A structure of the neural network includes a large quantity of nodes (or referred to as neurons) that are interconnected. Based on an operational model, the neural network learns input information and is trained by using the input information, to achieve a purpose of processing information. A neural network includes an input layer, a hidden layer, and an output layer. The input layer is responsible for receiving an input signal. The output layer is responsible for outputting a calculation result of the neural network. The hidden layer is responsible for calculation processes such as learning and training, and is a memory unit of the network. A memory function of the hidden layer is represented by a weight matrix. Generally, each neuron corresponds to a weighting coefficient.

Monocular photographic technology based device: "Monocular" should be understood as a single camera. The single camera may include a single lens or a plurality of lenses. A monocular photographic technology based device is a device that performs photographing by using a single camera that includes a single lens or a plurality of lenses. In an embodiment of this application, a single camera with a single lens is used as an example embodiment for description, but this application may also be applicable to a single camera including a plurality of lenses. For example, the single camera may include a lens array that includes two or more lenses. Because there is a fixed linear displacement relationship between the lenses in the lens array, monocular photographic technology based data can be obtained based on these linear displacement relationships combined with images or videos taken by the lenses.

Embodiments of this application provide a site model updating method and system. The method includes: obtaining a surveillance image, and determining, based on the obtained surveillance image, a change type of a device that changes and a change amount corresponding to the change type; calculating a pose and camera parameter of the surveillance image based on the surveillance image and a site model; determining, based on the pose and camera parameter of the surveillance image, a pose of the device that changes; and updating the site model based on the pose of the device that changes, the change type, and the change amount corresponding to the change type. The site model updating system includes a device change detection apparatus and a processor. The device change detection apparatus determines, based on a surveillance image, a change type of a device that changes and a change amount corresponding to the change type. The processor is configured to: obtain the surveillance image; calculate a pose and camera parameter of the surveillance image based on the surveillance image and a site model; determine, based on the pose and camera parameter of the surveillance image, a pose of the device that changes; and update the site model based on the pose of the device that changes, the change type, and the change amount corresponding to the change type.

Embodiments of this application may be used in the following application scenarios: updating a scenario model of a base station, a relay station, or the like in a telecommunication industry, updating a scenario model of a traffic indication system in an application scenario of security and surveillance in a smart city, updating a scenario model of a photovoltaic power generation system, or another application scenario in which a site model needs to be built and updated for a specific location.

Embodiments of this application may be adjusted and improved based on an application environment. This is not limited herein.

To make a person skilled in the art understand the solutions in this application better, the following describes embodiments of this application with reference to the accompanying drawings in embodiments of this application.

FIG. 1 is a diagram of a structure of a site model building and updating system according to an embodiment of this application. As shown in FIG. 1, the site model building and updating system may be divided into two parts, respectively corresponding to site model building and site model updating. The site model building part includes a modeling data collection device 102, a modeling data processing platform 106, and a site model building platform 108. The modeling data collection device 102 sends collected modeling data 104 to the modeling data processing platform 106 for processing. The modeling data processing platform 106 sends the processed modeling data to the site model building platform 108. Finally, the site model building platform 108 builds a site model 120 based on the processed modeling data. The site model updating part includes an updating data collection device 112, an updating data processing platform 116, and a site model updating platform 118. The updating data collection device 112 sends collected updating data 114 to the updating data processing platform 116 for processing. The updating data processing platform 116 sends the processed updating data to the site model updating platform 118. Finally, the site model updating platform 118 updates the site model 120 based on the processed updating data.

Still with reference to FIG. 1, the modeling data collection device 102 and the updating data collection device 112 belong to a front-end data collection apparatus 100. The modeling data processing platform 106, the site model building platform 108, the updating data processing platform 116, and the site model updating platform 118 belong to a back-end data processing apparatus 110. It should be understood that the front-end data collection apparatus 100 may be deployed at a location of or near a site, and may be understood as an edge apparatus or a local apparatus, for example, a camera or mobile phone disposed at a site. The back-end data processing apparatus 110 may be deployed at a location far away from a site, and may be understood as a cloud apparatus or a data center apparatus, for example, a data center connected via a network to a camera disposed at the site. In this application, a site is a scene that is within a specific spatial range or at a specified location. A meaning of the site may be defined with reference to a specific industry. For example, the site may be understood as a network base station or a relay station in a telecommunication industry, or may be understood as a traffic command system in a city security industry, or may be understood as a power generation system or a relay power station in a power transmission industry, or may be understood as an oil refinery or a gas station in a petroleum industry. These may be defined based on an application scenario, and are not limited herein.

Still with reference to FIG. 1, the modeling data collection device 102 is a corresponding device that obtains, by using a panoramic measurement technology, a laser point cloud measurement technology, a technology of combining images taken by a mobile phone, or another appropriate technical means, data used for building a site model. The panoramic measurement technology is used as an example. The modeling data collection device 102 is a panoramic camera, or another collection device that is based on the panoramic measurement technology. The modeling data 104 collected by the modeling data collection device 102 is a panoramic image representing all areas in a scene in which a site is located, or a plurality of panoramic images respectively representing different areas in a scene in which a site is located. The modeling data processing platform 106 may process the plurality of panoramic images respectively representing the different areas in the scene in which the site is located, to form a panoramic image representing all areas in the scene in which the site is located. Finally, the site model building platform 108 processes the processed modeling data 104 by using a conventional algorithm, for example, a panoramic binocular measurement algorithm, and generates the site model 120.

Still with reference to FIG. 1, the laser point cloud measurement technology is then used as an example. The modeling data collection device 102 is a laser scanner, or another collection device that is based on the laser point cloud measurement technology. The modeling data 104 collected by the modeling data collection device 102 is laser point cloud data representing all areas in a scene in which a site is located, or laser point cloud data respectively representing different areas in a scene in which a site is located. The modeling data processing platform 106 may splice the laser point cloud data respectively representing the different areas in the scene in which the site is located, to form laser point cloud data representing all areas in the scene in which the site is located. Finally, the site model building platform 108 processes the processed modeling data 104 by using a conventional algorithm, for example, a point cloud vector modeling algorithm, and generates the site model 120.

Still with reference to FIG. 1, the technology of combining images taken by a mobile phone is then used as an example. The modeling data collection device 102 is a portable device with photographing and shooting functions such as a mobile phone or a tablet computer. The modeling data 104 collected by the modeling data collection device 102 is picture and video data representing all areas in a scene in which a site is located, or picture and video data respectively representing different areas in a scene in which a site is located. The modeling data processing platform 106 may process the picture and video data respectively representing the different areas in the scene in which the site is located, to form picture and video data representing all areas in the scene in which the site is located. Finally, the site model building platform 108 processes the processed modeling data 104 by using a conventional algorithm, for example, a binocular measurement algorithm or a multi-source image combining algorithm, and generates the site model 120.

Still with reference to FIG. 1, for the site model updating part, the updating data collection device 112 is a mobile phone, a surveillance camera, a security lens, or another monocular photographic technology based device. It should be understood that although the site model building part obtains, by using the panoramic measurement technology, the laser point cloud measurement technology, the technology of combining images taken by a mobile phone, or another appropriate technical means, data used for building a site model, and generates the site model 120, a monocular photographic technology based device is suitable for the site model updating part. This is because a monocular photographic technology based device does not need to use another collection device when collecting the updating data 114, and therefore, there is no need to consider a coordination or synchronization problem. In addition, in most cases in actual application, sufficient precision and information can be obtained by using only a monocular photographic technology based device, to update the site model 120, thereby providing better versatility and convenience.

Still with reference to FIG. 1, the updating data collection device 112, namely, a monocular photographic technology-based device, obtains a surveillance image or a surveillance video. Images of all or some of frames in the surveillance video may be extracted and used as surveillance images. For example, a video image may be converted into a frame image by using a video frame extraction algorithm. The surveillance image collected by the updating data collection device 112 or the surveillance image extracted from the surveillance video is the updating data 114. The updating data 114 is sent to the updating data processing platform 116. The updating data processing platform 116 processes the received surveillance image. The updating data processing platform 116 mainly determines whether there is a device that changes in the surveillance image. When there is a device that changes, the updating data processing platform 116 further determines an area in which the device that changes is located, a change type, and a corresponding change amount. For more details about the updating data processing platform 116, refer to a description of the following embodiment. The site model updating platform 118 updates the site model 120 based on information provided by the updating data processing platform 116.

Still with reference to FIG. 1, in an implementation, the site model 120 includes an environment model of a site and a device model of a site. The environment model of a site may be understood as a background element in a scene in which the site is located, for example, a permanent building or a road, or may be understood as an element that is weakly associated with a preset function of the site, for example, a tree or a pedestrian. By using these background elements or weakly associated elements as environment models of the site, a frequency with which a site model is updated due to a change in these environment models can be reduced, thereby improving system efficiency and saving resources. In contrast, the device model of a site is a key element in a scene in which the site is located, for example, a device necessary for implementing a preset function of the site. For example, the site is a communication base station. A device model of the communication base station may be an antenna, a power supply device, and/or a relay device that are/is deployed at the communication base station, and/or another element that is strongly associated with a preset function of the communication base station. By classifying these key elements as device models of the site and increasing a frequency with which a site model is updated due to a change in these device models, it helps to improve system efficiency.

Still with reference to FIG. 1, in an implementation, when updating the site model 120, the site model updating platform 118 may perform updating for all areas in a scene in which a site is located or only for some areas in a scene in which a site is located. In an implementation, on the site model updating platform 118, a device in a scene in which a site is located may also be marked as an object of special attention, and high-sensitivity detection may be performed for a change in these objects of special attention. In an implementation, on the site model updating platform 118, some devices may also be marked as objects of general attention, and low-sensitivity detection may be performed for a change in these objects of general attention. For example, the site is a communication base station. An antenna may be marked as an object of special attention, whereas a power supply device configured to provide electrical energy to the antenna may be marked as an object of general attention. In this way, resources can be pooled to prioritize reflecting a change in a device that is marked as an object of special attention, helping to improve efficiency of resource utilization.

Still with reference to FIG. 1, the site model 120 may provide a plurality of applications. For example, the site model 120 may be used to implement ranging of a distance between a specific device and a ranging reference point. Three ground reference points are selected on an image including the specific device, to determine a benchmark plane of a ground plane, and a benchmark plane of the device is determined based on the benchmark plane of the ground plane. Then, the device is selected on the image, and a pose of the device is determined based on a result of intersection that is between light and the device and that is generated through simulation by using an existing algorithm, to determine information such as a height and angle of the device. The ranging reference point is selected on the image, and a pose of the ranging reference point is determined. In this way, the distance between the device and the ranging reference point is calculated. For another example, the site model 120 may be used to implement asset management, space assessment and design, EMF visualization, and the like of a site.

Figure 2:
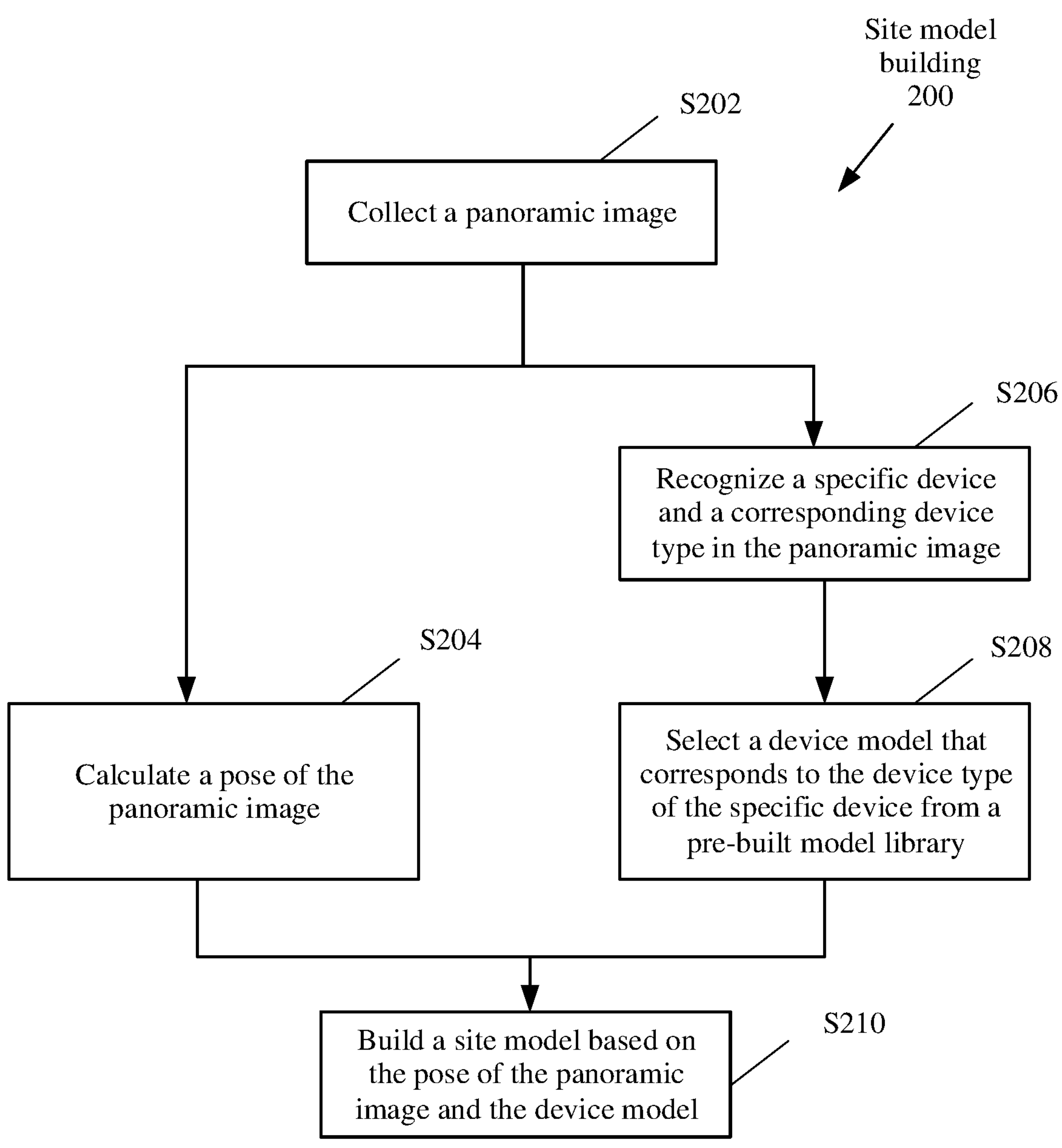
FIG. 2 is a flowchart of a site model building method according to an embodiment of this application.

FIG. 2 is a flowchart of a site model building method according to an embodiment of this application. It should be understood that the site model building method shown in FIG. 2 corresponds to the site model building part shown in FIG. 1. In an embodiment shown in FIG. 2, a panoramic measurement technology is used as an example, but after being adaptively modified, the method shown in FIG. 2 may also be applicable to other technical means such as a laser point cloud measurement technology and a technology of combining images taken by a mobile phone. As shown in FIG. 2, the site model building method 200 includes the following steps.

Step S202: Collect a panoramic image.

The collecting a panoramic image means obtaining, by using a panoramic camera, or another collection device that is based on the panoramic measurement technology, a panoramic image representing all areas in a scene in which a site is located, or a plurality of panoramic images respectively representing different areas in a scene in which a site is located. The plurality of panoramic images respectively representing the different areas in the scene in which the site is located may be processed, to form a panoramic image representing all areas in the scene in which the site is located. The collecting a panoramic image may be alternatively understood as the following: obtaining a panoramic video by using a panoramic camera; then extracting an image of a key frame in the panoramic video by using an image tracking algorithm; and finally using the extracted image of the key frame as a panoramic image representing all areas in a scene in which a site is located. In addition, after the panoramic image is collected, a pedestrian, the sky, an area of motion, or the like that interferes and that is in the image may be recognized by using a technology such as an image interfering area recognition algorithm, thereby reducing interference caused by these irrelevant factors or noise.

Step S204: Calculate a pose of the panoramic image.

The calculating a pose of the panoramic image means calculating, based on the panoramic image collected in step S202, a pose of a camera when the panoramic image is photographed. Herein, the pose is short for a position and an orientation. The pose may be represented by six variables, with three variables indicating the position and the other three variables indicating the orientation. The calculating a pose of a camera when the panoramic image is photographed may be implemented by using a conventional algorithm, for example, an image feature matching algorithm, an analytical aerial-triangulation algorithm, a multi-image pose calculation method (Structure From Motion, SFM), or another appropriate technical means. This is not limited herein.

Step S206: Recognize a device and a corresponding device type in the panoramic image.

To cover as large a scene as possible and as many elements as possible, a panoramic image usually covers a large range or even covers all areas in a scene in which a site is located. To simplify a subsequent processing process, a device and a corresponding device type may be recognized, implementing simplification to some extent. A device and a corresponding device type may be recognized from the panoramic image using a conventional algorithm, for example, feature recognition. For example, assuming that a device to be recognized is an antenna at a site, a device matching a feature of an antenna may be recognized from the panoramic image using the feature recognition algorithm, and these devices are marked as a device type of antenna. For another example, a device may be recognized as a power supply device or another type of device in the panoramic image.

Step S208: Select a device model that corresponds to the device type of the specific device from a pre-built model library.

Based on the device and its corresponding device type that are recognized in step S206, the device model that corresponds to the device type of the device may be selected from the pre-built model library. It should be understood that a device model in the pre-built model library may be a simplified geometric model, and a corresponding device is represented by several key points in a simplified manner, helping to simplify a subsequent operation and a data computing requirement. For example, assuming that the device recognized in step S206 is an antenna at a site, the pre-built model library may include a device model whose device type is antenna, and the device model is used to represent, in a simplified manner, an antenna that is actually complex in shape, as a geometric model including several key points, helping to make a subsequent operation simple.

Step S210: Build a site model based on the pose of the panoramic image and the device model.

Based on the pose of the panoramic image obtained in step S204 and the device model of the device obtained in step S208, the device may be replaced with the device model, and a pose of the device model in the panoramic image may be calculated. A position and size of an area in which the device is located in the panoramic image may be determined using a conventional algorithm, for example, an object detection technology. Then, after the device is replaced with the device model, the pose of the device model in the panoramic image is deduced based on several key points on the device model corresponding to the device. For example, the device is an antenna. After the antenna is replaced with a device model corresponding to the antenna, the pose of the device model in the panoramic image is a position and orientation of the device model corresponding to the antenna in the panoramic image. These may be combined with a geometric model of the device model to determine whether the antenna changes in position and orientation, for example, the position of the antenna is translated or the orientation of the antenna is changed.

In this way, with reference to the steps shown in FIG. 2, the pose of the panoramic image is calculated based on the collected panoramic image, the device type is recognized from the panoramic image, and then the site model is built with reference to the device model in the pre-built model library.

Figure 3:
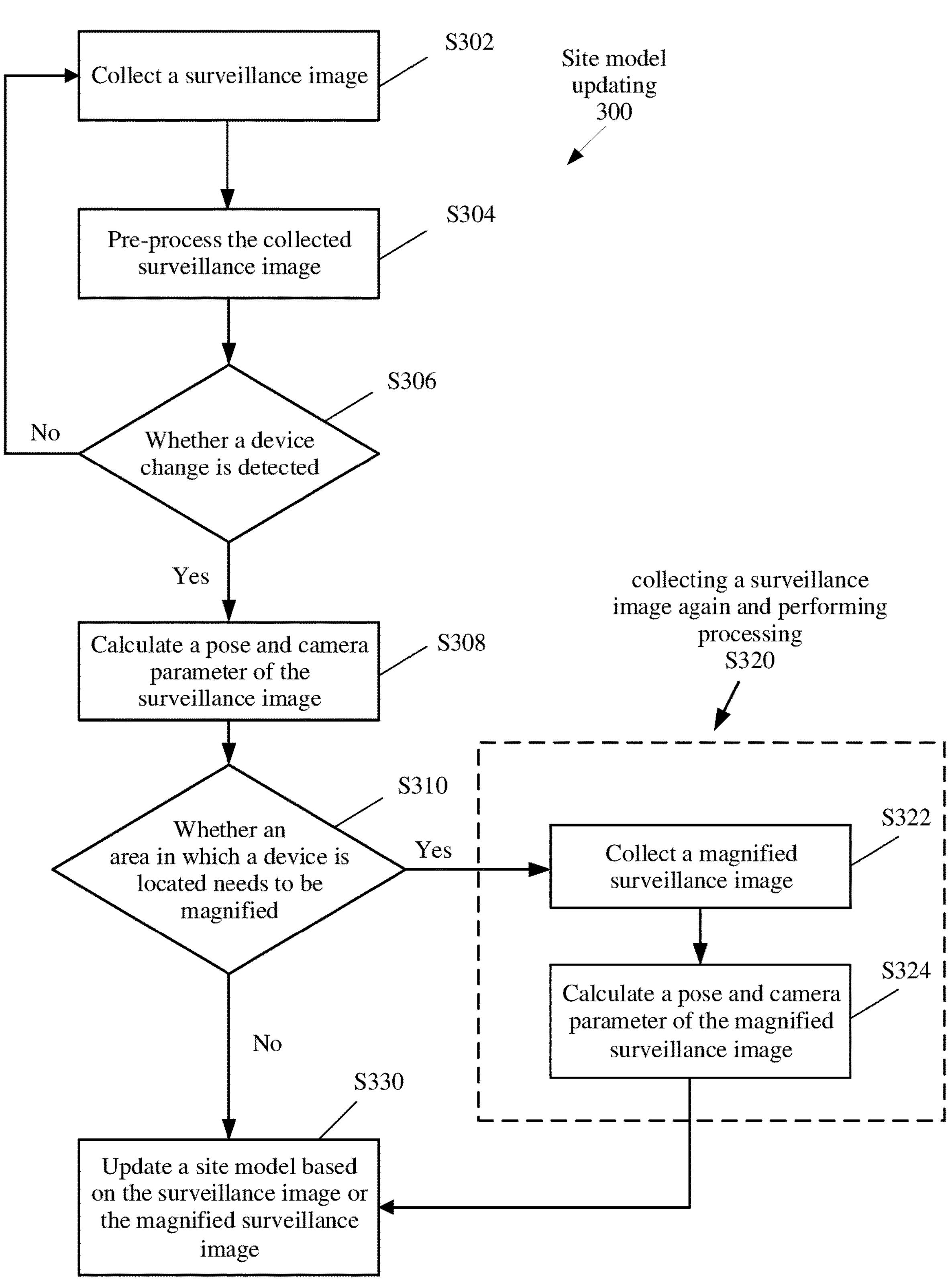
FIG. 3 is a flowchart of a site model updating method according to an embodiment of this application.

FIG. 3 is a flowchart of a site model updating method according to an embodiment of this application. It should be understood that the site model updating method shown in FIG. 3 corresponds to the site model updating part shown in FIG. 1. As shown in FIG. 3, the site model updating method 300 includes the following steps.

Step S302: Collect a surveillance image.

The collecting a surveillance image may be obtaining a surveillance image or a surveillance video by using a mobile phone, a surveillance camera, a security lens, or another monocular photographic technology based device. Images of all or some of frames in the surveillance video may be extracted and used as surveillance images. In some example embodiments, a video image may be converted into a frame image by using a video frame extraction algorithm.

Step S304: Pre-process the collected surveillance image.

The pre-processing the collected surveillance image means performing operations such as exposure fixing, blur restoration, and rain and fog removal on the surveillance image, thereby optimizing quality of the surveillance image, improving clarity of image data, and facilitating subsequent processing. The pre-processing the surveillance image may further include operations such as performing exposure detection to exclude an overexposed image and an underexposed image, performing blur detection to exclude a blurry image, and using a raindrop detection algorithm to exclude an image including a raindrop. It should be understood that the pre-processing the surveillance image may be performed on a local device that collects the surveillance image, for example, a surveillance camera, a security camera, or another edge device at a site. In this way, the collected surveillance image can be pre-processed on a side of a collection end, reducing complexity of a subsequent operation and helping to save resources and improve efficiency. In some example embodiments, the site model updating method 300 may not include step S304, that is, step S306 is directly performed after step S302.

Step S306: Detect a device change. If a device change is detected, step S308 is performed; or if no device change is detected, step S302 is performed.

In step S306, the collected surveillance image or the pre-processed collected surveillance image is input into a neural network model. The neural network model automatically determines whether there is a device that changes in the surveillance image, and further determines an area in which the device that changes is located, a change type, and a corresponding change amount. In step S306, a result output by the neural network model that is used to detect a device change includes the change type of the device that changes and the change amount corresponding to the change type. The change type is one of a plurality of preset change types. Herein, the change type of the device that changes includes device addition, device deletion, device movement, device rotation, and the like. Device addition means that the device does not exist in a surveillance image in which it is determined in a previous time period that there is no change, but exists in the current surveillance image. Device deletion means that the device exists in a surveillance image in which it is determined in a previous time period that there is no change, but does not exist in the current surveillance image. Device movement means that compared with a position of the device in a surveillance image in which it is determined in a previous time period that there is no change, a position of the device in the current surveillance image changes. Device rotation means that compared with an orientation of the device in a surveillance image in which it is determined in a previous time period that there is no change, an orientation of the device in the current surveillance image changes. In this way, a majority of device changes of the device can be covered by setting change types such as device addition, device deletion, device movement, and device rotation. It should be understood that an actual change of the device may alternatively be a combination of the foregoing basic change types. For example, two changes of device movement and device rotation may simultaneously occur on the device. Therefore, the change type of the device that changes may further include device addition, device deletion, device movement, device rotation, simultaneous device movement and rotation, and the like. In step S306 that is a step of detecting a device change, a finally output result includes an area in which a device that changes is located, a change type, and a corresponding change amount. Details are described in the following embodiment related to FIG. 5.

Step S308: Calculate a pose and camera parameter of the surveillance image.

The calculating a pose of the surveillance image means calculating a pose of a camera in a three-dimensional spatial coordinate system when the surveillance image is photographed. Herein, the pose is short for a position and an orientation. The pose may be represented by six variables, with three variables indicating the position and the other three variables indicating the orientation. The calculating a pose of a camera when the surveillance image is photographed may be implemented by using a conventional algorithm, for example, a PNP (Perspective-N-Point) algorithm, a pose estimation algorithm, or another appropriate technical means. This is not limited herein. The calculating a camera parameter of the surveillance image means calculating a parameter that is used by the camera when the camera takes the surveillance image, for example, a focal length, coordinates of a principal point in an image, and a distortion parameter. It should be understood that the calculating a pose of the surveillance image is for calculation of an external parameter that is used by the camera when the camera takes the surveillance image, whereas the calculating a camera parameter of the surveillance image is for calculation of internal imaging information that is used by the camera when the camera takes the surveillance image.

Step S310: Determine whether the area in which the device is located needs to be magnified. If the area in which the device is located needs to be magnified, step S320 is performed; or if the area in which the device is located does not need to be magnified, step S330 is performed.

When it is determined in step S306 that there is a device that changes in the surveillance image, a proportion of an area in which the device that changes is located in the surveillance image may be determined. For example, a proportion of an area occupied by the area in which the device that changes is located in the entire surveillance image is calculated. The proportion of the area in which the device that changes is located in the surveillance image is compared with a preset proportion. When the proportion is less than the preset proportion, it is determined that the area in which the device is located needs to be magnified, and step S320 is performed. When the proportion is not less than the preset proportion, it is determined that the area in which the device is located does not need to be magnified, and step S312 is performed. The preset proportion may be a preset value. For example, the preset proportion is set to 30%. Assuming that the proportion of the area in which the device that changes is located in the surveillance image is 1%, it is considered that the proportion is less than the preset proportion, and it is determined that the area in which the device is located needs to be magnified. In actual application, a surveillance image usually covers a scene in a large area, but an area in which a device that changes is located may occupy only a small part of the surveillance image. In other words, a proportion of the area (in which the device that changes is located in the surveillance image) may be small. In this way, through a comparison between the proportion and the preset proportion, the area in which the device that changes is located may be selectively magnified, to obtain a better effect.

In an implementation, a meaning of the proportion of the area in which the device that changes is located in the surveillance image includes a stereoscopic projection of a region of interest (ROI) of the device that changes on the surveillance image. The stereoscopic projection may be understood as a projection of a cube including eight points. A proportion of an area occupied by the stereoscopic projection of the ROI on the entire surveillance image is the proportion.

Step S320: Collect a surveillance image again and perform processing. Step S320 is further subdivided into step S322 and step S324.

Step S322: Collect a magnified surveillance image.

A magnification factor is calculated based on the proportion calculated in step S310 and the preset proportion. For example, assuming that the proportion of the area in which the device that changes is located in the surveillance image is 1%, and the preset proportion is 30%, the magnification factor is sqrt(30) and is about 5.5, where sqrt represents a calculation of obtaining a square root. Correspondingly, when the magnification factor is 5.5, this means that a focal length of the device collecting the surveillance image needs to be magnified by a factor of 5.5, to improve a proportion of the area in which the device that changes is located in the magnified surveillance image. The focal length of the device collecting the surveillance image may be adjusted by using a conventional technical means. This is not limited herein.

Step S324: Calculate a pose and camera parameter of the magnified surveillance image.

The pose and camera parameter of the magnified surveillance image may be calculated based on the magnified surveillance image collected in step S322 and a site model. Details are described in the following embodiment related to FIG. 4.

Step S330: Update a site model based on the surveillance image or the magnified surveillance image.

If it is determined in step S310 that the area in which the device is located does not need to be magnified, the site model is updated based on the surveillance image. If it is determined in step S310 that the area in which the device is located needs to be magnified, the site model is updated based on the magnified surveillance image obtained in step S320. It is assumed that it is determined in step S310 that the area in which the device is located does not need to be magnified. Based on the surveillance image obtained in step S302, based on the pose and camera parameter of the surveillance image that are obtained in step S308, and with reference to the area in which the device that changes is located, the change type, and the change amount that are learned of from step S306, a device model corresponding to the device that changes may be recognized from a pre-built model library used when the site model is built. Then, a post-change pose of the device model is determined based on the change type and the change amount. Finally, the site model is adjusted to reflect the change of the device. For example, assuming that a device changes and a change type is device addition, this means that a device model corresponding to the device needs to be added to the area in which the device that changes is located, and the site model needs to be updated. For another example, assuming that a device changes and a change type is device deletion, this means that a device model corresponding to the device needs to be deleted from the site model. For another example, assuming that a device changes and a change type is device movement, this means that a pose of a device model corresponding to the device needs to be adjusted to reflect the change of device movement.

In this way, with reference to the steps shown in FIG. 3, the neural network model automatically determines whether there is a device that changes in a surveillance image, further determines an area in which the device that changes is located, a change type, and a corresponding change amount, determines whether the step of collecting a surveillance image again and performing processing needs to be performed, and finally updates a site model based on the surveillance image or a magnified surveillance image.

Figure 4:
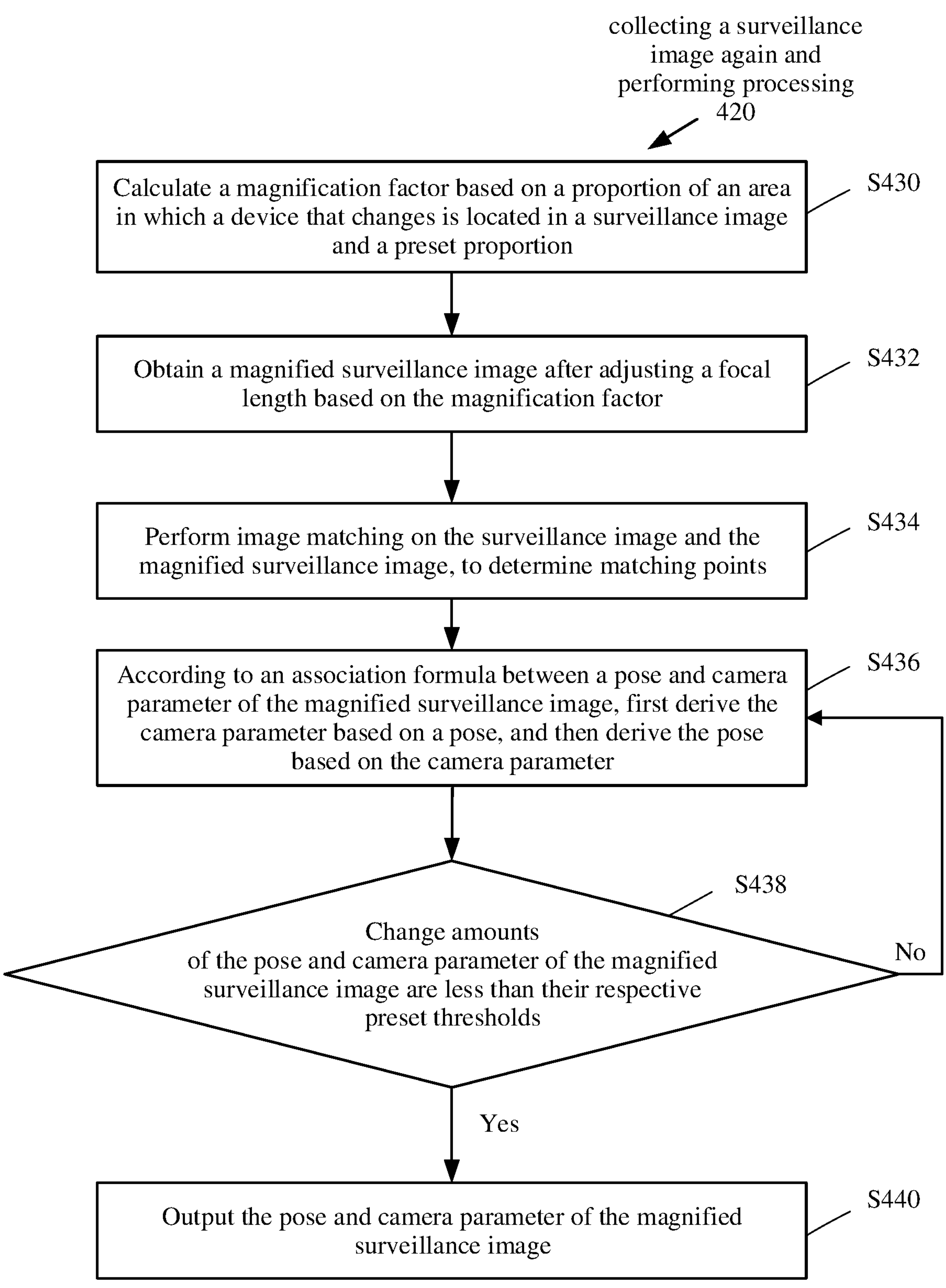
FIG. 4 is a flowchart of a step of collecting a surveillance image again and performing processing shown in FIG. 3 according to an embodiment of this application.

FIG. 4 is a flowchart of a step of collecting a surveillance image again and performing processing shown in FIG. 3 according to an embodiment of this application. Step 420 of collecting a surveillance image again and performing processing shown in FIG. 4 corresponds to step S320 of collecting a surveillance image again and performing processing shown in FIG. 3. In addition, step S322 and step S324 shown in FIG. 3 are expanded and further described. As shown in FIG. 4, step 420 of collecting a surveillance image again and performing processing includes the following step.

Step S430: Calculate a magnification factor based on a proportion of an area in which a device that changes is located in a surveillance image and a preset proportion.

Relevant details about the calculating a proportion and a magnification factor are similar to step S322 shown in FIG. 3, and therefore, details are not described herein again.

Step S432: Obtain a magnified surveillance image after adjusting a focal length based on the magnification factor.

Relevant details about the obtaining a magnified surveillance image after adjusting a focal length are similar to step S322 shown in FIG. 3, and therefore, details are not described herein again.

Step S434: Perform image matching on the surveillance image and the magnified surveillance image, to determine matching points.

The performing image matching on the surveillance image and the magnified surveillance image, to determine matching points means extracting, from the surveillance image and the magnified surveillance image in a feature extraction manner, feature points corresponding to the device that changes, and performing image matching, to determine the matching points.

Step S436: According to an association formula between a pose and camera parameter of the magnified surveillance image, first derive the camera parameter based on a pose, and then derive the pose based on the camera parameter.

Relevant details about step S436 correspond to the calculating a pose and camera parameter of the magnified surveillance image in step S324 shown in FIG. 3. It should be understood that the calculating a pose of the magnified surveillance image means calculating a pose of a camera in a three-dimensional spatial coordinate system when the magnified surveillance image is photographed. Herein, the pose is short for a position and an orientation. The pose may be represented by six variables, with three variables indicating the position and the other three variables indicating the orientation. The calculating a camera parameter of the magnified surveillance image means calculating a parameter that is used by the camera when the camera takes the magnified surveillance image, for example, a focal length, coordinates of a principal point in an image, and a distortion parameter. It should be understood that the calculating a pose of the magnified surveillance image is for calculation of an external parameter that is used by the camera when the camera takes the magnified surveillance image, whereas the calculating a camera parameter of the magnified surveillance image is for calculation of internal imaging information that is used by the camera when the camera takes the magnified surveillance image.

Step S436 and step S324 shown in FIG. 3 relate to calculation of the pose and camera parameter of the magnified surveillance image. This differs from calculation of the pose and camera parameter of the surveillance image in step S308 shown in FIG. 3 in that the magnified surveillance image is obtained after the following operations are performed: adjusting, based on the magnification factor, a focal length of a collection device that collects a surveillance image, and then performing collection again. Therefore, in an ideal case, the camera taking the magnified surveillance image and the camera taking the surveillance image should have a same external parameter, that is, in a same pose. Adjustment of the focal length affects only the internal imaging information of the camera, namely, the camera parameter. However, in actual application, between a moment at which the surveillance image is taken and a moment at which the magnified surveillance image is taken, the collection device may be affected by various external factors such as a shake caused by wind or vibration, and may also be affected by an internal factor such as a loose lens due to device aging. As a result, the pose and camera parameter of the magnified surveillance image are different from the pose and camera parameter of the surveillance image, respectively.

Therefore, the pose and camera parameter of the magnified surveillance image need to be derived based on the calculated pose and camera parameter of the surveillance image and by using an association formula between a pose and camera parameter of an image in the conventional technology. First, the pose of the surveillance image is used as an initial pose of the magnified surveillance image; then, the initial pose of the magnified surveillance image is imported into the association formula as a constant, and then the camera parameter of the magnified surveillance image is derived; and then, the derived camera parameter of the magnified surveillance image is imported into the association formula as a constant, and then the pose of the magnified surveillance image is derived. In this way, an iterative calculation process is completed. Each time step S436 is performed, the foregoing iterative calculation process is performed once according to the association formula in the conventional technology. In this way, the pose and camera parameter of the magnified surveillance image are obtained.

Step S438: Determine whether change amounts of the pose and camera parameter of the magnified surveillance image are less than their respective preset thresholds. If the change amounts are all less than their respective preset thresholds, step S440 is performed; or if at least one is greater than a preset threshold, step S436 is performed.

After step S436 is performed, the pose and camera parameter of the magnified surveillance image are obtained after one iterative calculation process is completed. In step S438, it is determined whether to terminate the iteration. If an iteration termination condition is not met, a process returns to step S436, and a next iterative calculation process is performed until the iteration termination condition specified in step S438 is met. Herein, the iteration termination condition is set as follows: Change amounts of the pose and camera parameter of the magnified surveillance image that are obtained after one iterative calculation process in step S436 ends are less than their respective preset thresholds. The change amount of the pose of the magnified surveillance image is a difference between poses of the magnified surveillance image that exist before and after one iterative calculation process in step S436 is performed. A pose of the magnified surveillance image that exists before one iterative calculation process in step S436 is performed is compared with a pose of the magnified surveillance image that is obtained after the iterative calculation process in step S436 is performed. Similarly, the change amount of the camera parameter of the magnified surveillance image is a difference between camera parameters of the magnified surveillance image that exist before and after one iterative calculation process in step S436 is performed. A camera parameter of the magnified surveillance image that exists before one iterative calculation process in step S436 is performed is compared with a camera parameter of the magnified surveillance image that is obtained after the iterative calculation process in step S436 is performed. The change amounts of the pose and camera parameter of the magnified surveillance image may correspond to different preset thresholds. For example, a preset threshold corresponding to the change amount of the pose of the magnified surveillance image is set to 0.0001, whereas a preset threshold corresponding to the change amount of the camera parameter of the magnified surveillance image is set to 0.001. The iteration termination condition is met only when the change amounts of the pose and camera parameter of the magnified surveillance image are less than their respective corresponding preset thresholds.

Step S440: Output the pose and camera parameter of the magnified surveillance image.

After it is determined in step S438 that the iteration termination condition is met, the pose and camera parameter of the magnified surveillance image that meet the iteration termination condition are output. An output result of step S440 corresponds to an output result of step S324 shown in FIG. 3. That is, the calculated pose and camera parameter of the magnified surveillance image are output. The output result of step S440 is also an output result of step S320 of collecting a surveillance image again and performing processing shown in FIG. 3.

In this way, with reference to the steps shown in FIG. 4, the proportion of the area in which the device that changes is located in the surveillance image is determined; the proportion is compared with the preset proportion; when the proportion is less than the preset proportion, the magnified surveillance image is obtained; the pose and camera parameter of the magnified surveillance image are calculated based on the magnified surveillance image and a site model; and the site model is updated based on the pose and camera parameter of the magnified surveillance image.

Figure 5:
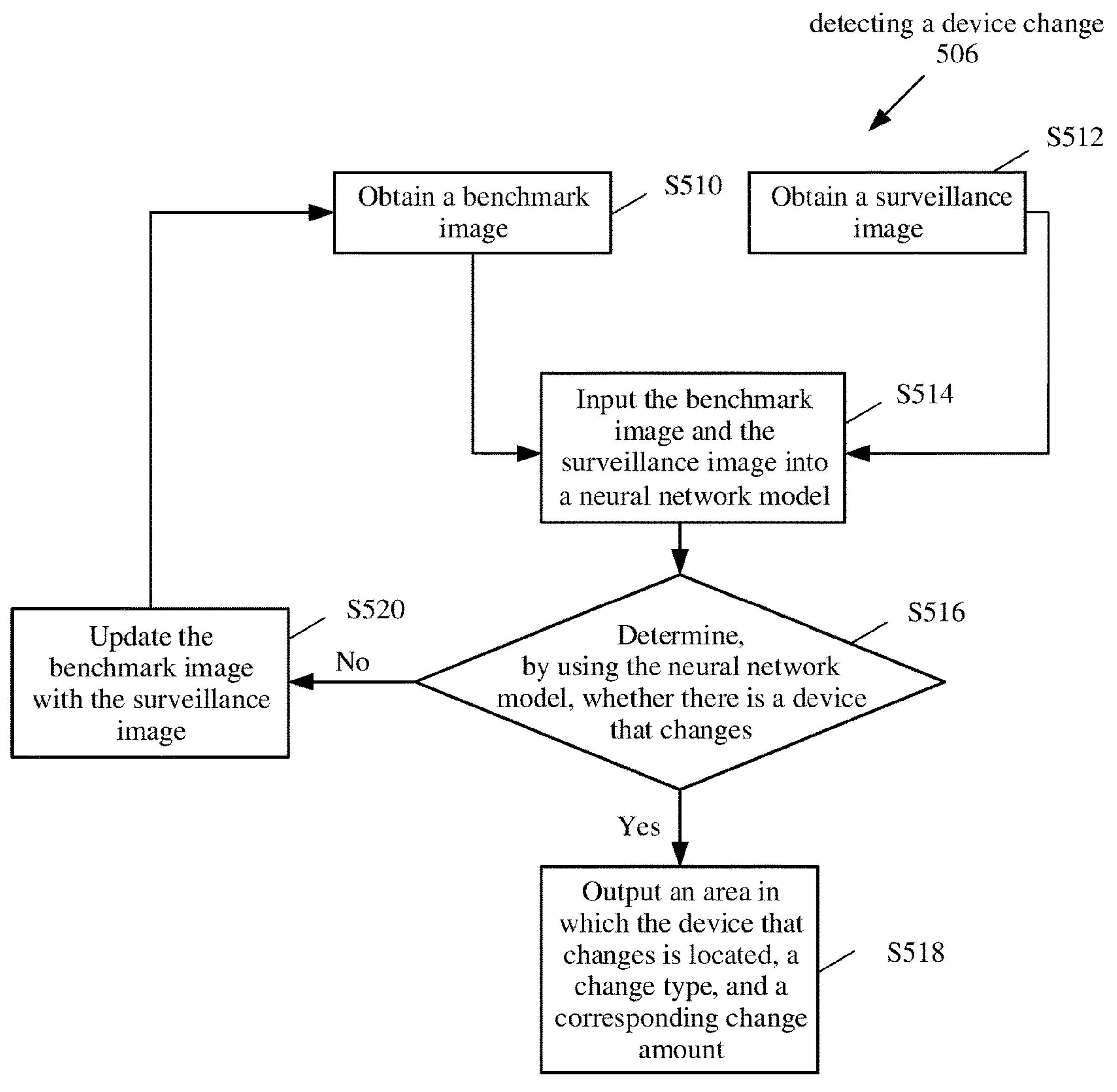
FIG. 5 is a flowchart of a step of detecting a device change in a method shown in FIG. 3 according to an embodiment of this application.

FIG. 5 is a flowchart of a step of detecting a device change in a method shown in FIG. 3 according to an embodiment of this application. Step 506 of detecting a device change in FIG. 5 corresponds to step S306 shown in FIG. 3: "whether a device change is detected". As shown in FIG. 5, step 506 of detecting a device change includes the following steps.

Step S510: Obtain a benchmark image.

The benchmark image is a reference image used for determining whether there is a device that changes, and may be a surveillance image in which it is determined in a previous time period that there is no change, or may be a manually input reference image.

Step S512: Obtain a surveillance image.

The obtaining a surveillance image may be obtaining a surveillance image or a surveillance video by using a mobile phone, a surveillance camera, a security lens, or another monocular photographic technology based device. Images of all or some of frames in the surveillance video may be extracted and used as surveillance images. In some example embodiments, a video image may be converted into a frame image by using a video frame extraction algorithm.

It should be noted that step 510 and step 512 are not in a chronological order, and may be simultaneously performed or separately performed in any order.

Step S514: Input the benchmark image and the surveillance image into a neural network model.

The benchmark image and the surveillance image are input into the neural network model. The neural network model is used to determine whether there is a device that changes in the surveillance image, a change type of the device that changes, and a corresponding change amount.

Step S516: Determine, by using the neural network model, whether there is a device that changes. If there is a device that changes, step S518 is performed; or if there is no device that changes, step S520 is performed.

Whether there is a device that changes in the surveillance image can be learned of based on an output result of the neural network model. When there is a device that changes in the surveillance image, step S418 is performed, to output the surveillance image in which there is a device that changes, an area in which the device is located, and a change type. When there is no device that changes in the surveillance image, step S420 may be performed, to replace the benchmark image with the surveillance image, that is, to use the surveillance image as a benchmark image that is used next time the neural network model is used to determine whether there is a device that changes.

It should be understood that the result output by the neural network model includes a change type of a device that changes and a change amount corresponding to the change type. The change type is one of a plurality of preset change types. The plurality of preset change types cover a vast majority of changes that may occur on a device, and include device addition, device deletion, device movement, device rotation, and/or the like. In some example embodiments, the plurality of preset change types may further include a combination of the foregoing basic change types, for example, including a change that device movement and device rotation simultaneously occur on a device. Therefore, the plurality of preset change types may further include device addition, device deletion, device movement, device rotation, simultaneous device movement and rotation, and the like. A method for training the neural network model used in step S516 is described in detail in the following embodiment related to FIG. 6.

The benchmark image may be understood as being set as a surveillance image in which it is determined in a previous time period that there is no change. Device addition means that the device does not exist in the benchmark image but exists in the current surveillance image. Device deletion means that the device exists in the benchmark image but does not exist in the current surveillance image. Device movement means that compared with a position of the device in the benchmark image, a position of the device in the current surveillance image changes. Device rotation means that compared with an orientation of the device in the benchmark image, an orientation of the device in the current surveillance image changes. In this embodiment of this application, the change types such as device addition, device deletion, device movement, and device rotation may be preset, and the benchmark image and the surveillance image may be compared, implementing that the neural network model determines whether there is a change and recognizes a change type.

In some example embodiments, a trained neural network model may be more sensitive to a change in a specific device model. For example, for an area in which a device recognized as a specific device type is located and that is in a surveillance image, the neural network model may be more sensitive to an input variable representing a degree of change in the area by setting a coefficient of a stochastic gradient descent algorithm to output a result for each class hierarchy. In this way, a device in a scene in which a site is located may be marked as an object of special attention, and high-sensitivity detection may be performed for a change in these objects of special attention; and some devices may be marked as objects of general attention, and low-sensitivity detection may be performed for a change in these objects of general attention.

Step S518: Output the area in which the device that changes is located, the change type, and the corresponding change amount.

When it is determined, by using the neural network model, in step S516 that there is a device that changes in the surveillance image, an area in which the device that changes is located, a change type, and a corresponding change amount are output.

Step S520: Update the benchmark image with the surveillance image.

When it is determined, by using the neural network model, in step S516 that there is no device that changes in the surveillance image, the benchmark image may be replaced with the current surveillance image. In other words, if it is determined based on the output result of the neural network model that there is no device that changes in the surveillance image obtained in a current time period, the surveillance image obtained in the current time period may be used as a benchmark image relative to a surveillance image obtained in a next time period. For example, it may be set that a device change is detected on time every day, and a surveillance image is collected and a device change is detected at 9 a.m. and 10 a.m. separately. Assuming that no device that changes is found in the surveillance image collected at 9 a.m., the surveillance image collected at 9 a.m. may be used to replace the benchmark image and compared with the surveillance image collected at 10 a.m., to determine whether there is a device that changes in the surveillance image collected at 10 a.m.

In this way, with reference to the steps shown in FIG. 5, the benchmark image and the surveillance image are input into the trained neural network model, to determine whether there is a device that changes in the surveillance image. When there is a device that changes in the surveillance image, an area in which the device that changes is located, a change type, and a corresponding change amount are output. When there is no device that changes in the surveillance image, the benchmark image may be updated with the current surveillance image.

Figure 6:
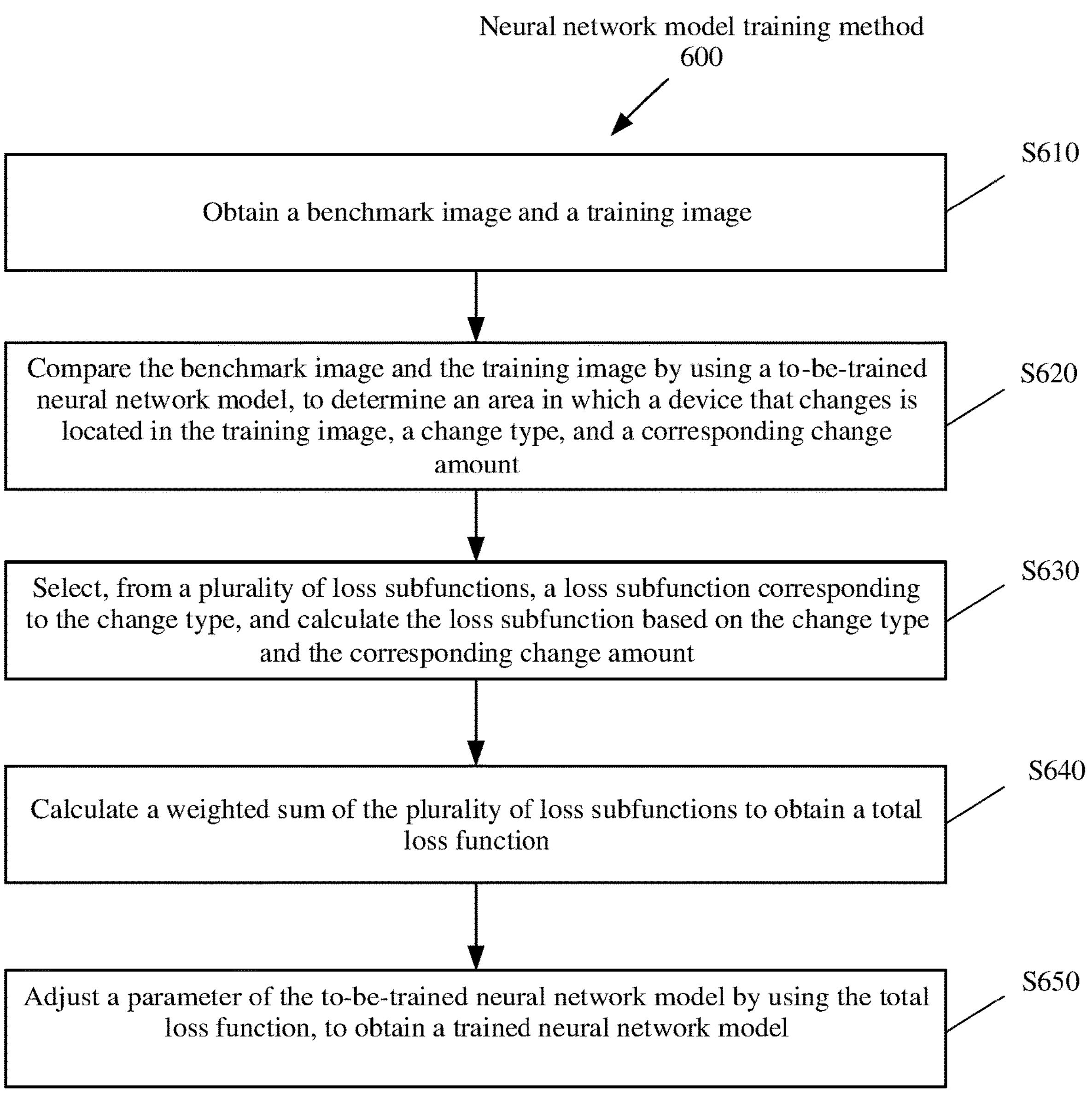
FIG. 6 is a flowchart of a method for training a neural network model shown in FIG. 5 according to an embodiment of this application.

FIG. 6 is a flowchart of a method for training a neural network model shown in FIG. 5 according to an embodiment of this application. The neural network model training method 600 shown in FIG. 6 is used to train the neural network model that is used to determine whether there is a device that changes and that is used in step S516 in FIG. 5. The neural network model also outputs an area in which the device that changes is located, a change type, and a corresponding change amount. As shown in FIG. 6, the neural network model training method 600 includes the following steps.

Step S610: Obtain a benchmark image and a training image.

To train a neural network model so that the neural network model has a predictive capability of determining whether there is a device that changes in a surveillance image, the neural network model is used to compare a benchmark image and a training image and provide a prediction result in a training process, and then a parameter of the neural network model is adjusted based on a feedback of the prediction result, thereby achieving a purpose of training. In view of this, in the embodiment shown in FIG. 6, the benchmark image is an image that is used as a reference image, in the neural network model training process, in which there is no device that changes. The training image is an image that is used by the neural network model in the neural network model training process for comparison with the benchmark image and determining of whether there is a device that changes in the training image relative to the benchmark image. In the embodiment shown in FIG. 6, the neural network model training method uses a supervised learning manner. That is, the training image has a label. The label includes the following information: whether there is a device that changes in the training image with the label relative to the benchmark image, a change type of the device that changes, and a corresponding change amount. The prediction result of the neural network model can be evaluated based on the information carried in the label, helping to adjust the parameter of the neural network model.

It should be understood that in the embodiment shown in FIG. 6, the benchmark image is for the neural network model training process. In the embodiment shown in FIG. 5, S510 of obtaining a benchmark image is also mentioned. The benchmark image mentioned in FIG. 6 is for the neural network model training process, whereas the benchmark image mentioned in FIG. 5 is for an execution process of the trained neural network model. In the embodiment shown in FIG. 6, the neural network model is trained to learn to determine whether there is a device that changes in the training image relative to the benchmark image. The resulting trained neural network model may be used to perform a prediction task in the embodiment shown in FIG. 5, that is, determining whether there is a device that changes in the surveillance image obtained in step S512 relative to the benchmark image obtained in step S510. In addition, the neural network model training method in the embodiment shown in FIG. 6 is a method for training a multi-task neural network model. Therefore, the trained neural network model may not only predict whether there is a device that changes, but also output an area in which the device that changes is located, a change type, and a corresponding change amount.

Step S620: Compare the benchmark image and the training image, to determine an area in which a device that changes is located in the training image, a change type, and a corresponding change amount.

It is mentioned in step S610 that the training image has a label. The label includes the following information: whether there is a device that changes in the training image with the label relative to the benchmark image, a change type of the device that changes, and a corresponding change amount. Therefore, the benchmark image and training image obtained in step S610 are both input into the to-be-trained neural network model. The to-be-trained neural network model compares the benchmark image and the training image, to determine the area in which the device that changes is located in the training image, the change type, and the corresponding change amount. Herein, the change type is one of a plurality of preset change types. The plurality of preset change types include device addition, device deletion, device movement, device rotation, and the like, and may further include device addition, device deletion, device movement, device rotation, simultaneous device movement and rotation, and the like. It should be understood that details about the plurality of preset change types mentioned in step S620 maintain consistent with details about the plurality of preset change types mentioned in step S516 of "determining, by using the neural network model, whether there is a device that changes". This is because in the embodiment shown in FIG. 5, the neural network model obtained through training by using the method shown in FIG. 6 is used for execution in step S516.

Step S630: Select, from a plurality of loss subfunctions, a loss subfunction corresponding to the change type, and calculate the loss subfunction based on the change type and the corresponding change amount.

In step S620, the benchmark image and training image obtained in step S610 are both input into the to-be-trained neural network model, and an output result of the to-be-trained neural network model is obtained, that is, the area in which the device that changes is located in the training image, the change type, and the corresponding change amount. These output results are used for calculating a loss function, to adjust a parameter of the to-be-trained neural network model. It should be understood that the neural network model training method in the embodiment shown in FIG. 6 is a method for training a multi-task neural network model. Therefore, the output result of the to-be-trained neural network model includes both an output result required for performing a classification task, that is, whether there is a device that changes and a change type, and an output result required for performing a quantization task, namely, a change amount corresponding to the change type. In view of this, the plurality of loss subfunctions are designed. The plurality of loss subfunctions are in a one-to-one correspondence with the plurality of preset change types. Each of the plurality of loss subfunctions is determined based on a change amount corresponding to a preset change type that corresponds to the loss subfunction. In this way, the neural network model can be trained to perform a variety of tasks.

Still with reference to FIG. 6, in step S630, the plurality of preset change types include device addition, and a change amount corresponding to device addition includes a maximum value of pixel dimensions of a surveillance image. For a loss subfunction corresponding to the preset change type of device addition, refer to a formula (1).

$$L_{ADD}=\text{Loss}(p_{max},P_{ADD},Y) \tag{1}$$

In the formula (1), $L_{ADD}$ represents the loss subfunction corresponding to the preset change type of device addition; $p_{max}$ represents the maximum value of the pixel dimensions of the surveillance image; $P_{ADD}$ represents a probability that a change type predicted by the to-be-trained neural network model is device addition; and Y represents the label carried by the training image in step S610. By using the loss subfunction shown in the formula (1), the probability that the change type predicted by the to-be-trained neural network model after performing a prediction task is device addition, and a change amount that corresponds to device addition and that is predicted by the to-be-trained neural network model after performing a quantization task, may be compared with the information carried in the label, being used as a basis for adjusting the parameter of the to-be-trained neural network model.

Still with reference to FIG. 6, in step S630, the plurality of preset change types include device deletion, and a change amount corresponding to device deletion includes a negative value of a maximum value of pixel dimensions of a surveillance image. For a loss subfunction corresponding to the preset change type of device deletion, refer to a formula (2).

$$L_{DEL}=\text{Loss}(-p_{max},P_{DEL},Y) \tag{2}$$

In the formula (2), $L_{DEL}$ represents the loss subfunction corresponding to the preset change type of device deletion; $-p_{max}$ represents the negative value of the maximum value of the pixel dimensions of the surveillance image; $P_{DEL}$, represents a probability that a change type predicted by the to-be-trained neural network model is device deletion; and Y represents the label carried by the training image in step S610. By using the loss subfunction shown in the formula (2), the probability that the change type predicted by the to-be-trained neural network model after performing a prediction task is device deletion, and a change amount that corresponds to device deletion and that is predicted by the to-be-trained neural network model after performing a quantization task, may be compared with the information carried in the label, being used as a basis for adjusting the parameter of the to-be-trained neural network model.

Still with reference to FIG. 6, in step S630, the plurality of preset change types include device movement, and a change amount corresponding to device movement includes a moving distance of a center point of the device that changes. For a loss subfunction corresponding to the preset change type of device movement, refer to a formula (3).

$$L_{MOV}=\text{Loss}(\Delta d,P_{MOV},Y) \tag{3}$$

In the formula (3), $L_{MOV}$ represents the loss subfunction corresponding to the preset change type of device movement; $\Delta d$ represents the moving distance of the center point of the device that changes; $P_{MOV}$ represents a probability that a change type predicted by the to-be-trained neural network model is device movement; and Y represents the label carried by the training image in step S610. By using the loss subfunction shown in the formula (3), the probability that the change type predicted by the to-be-trained neural network model after performing a prediction task is device movement, and a change amount that corresponds to device movement and that is predicted by the to-be-trained neural network model after performing a quantization task, may be compared with the information carried in the label, being used as a basis for adjusting the parameter of the to-be-trained neural network model.

Still with reference to FIG. 6, in step S630, the plurality of preset change types include device rotation, and a change amount corresponding to device rotation includes a turning distance of a connection line between an edge and a center point of the device that changes. For a loss subfunction corresponding to the preset change type of device rotation, refer to a formula (4).

$$L_{ROTATE}=\text{Loss}(\Delta A,P_{ROTATE},Y) \tag{4}$$

In the formula (4), $L_{ROTATE}$ represents the loss subfunction corresponding to the preset change type of device rotation; $\Delta A$ represents the turning distance of the connection line between the edge and the center point of the device that changes; $P_{ROTATE}$ represents a probability that a change type predicted by the to-be-trained neural network model is device rotation; and Y represents the label carried by the training image in step S610. By using the loss subfunction shown in the formula (4), the probability that the change type predicted by the to-be-trained neural network model after performing a prediction task is device rotation, and a change amount that corresponds to device rotation and that is predicted by the to-be-trained neural network model after performing a quantization task, may be compared with the information carried in the label, being used as a basis for adjusting the parameter of the to-be-trained neural network model.

Still with reference to FIG. 6, in step S630, the plurality of preset change types include simultaneous device movement and rotation, and a change amount corresponding to simultaneous device movement and rotation includes a moving distance of a center point of the device that changes and a turning distance of a connection line between an edge and the center point of the device that changes. For a loss subfunction corresponding to the preset change type of simultaneous device movement and rotation, refer to a formula (5).

$$L_{MOV\_ROTATE}=\text{Loss}(\Delta d+\Delta A, f(P_{MOV}, P_{ROTATE}), Y) \quad (5)$$

In the formula (5), $L_{MOV}$ ROTATE represents the loss subfunction corresponding to the preset change type of simultaneous device movement and rotation; Δd represents the moving distance of the center point of the device that changes; ΔA represents the turning distance of the connection line between the edge and the center point of the device that changes; $P_{MOV}$ represents a probability that a change type predicted by the to-be-trained neural network model is device movement; $P_{ROTATE}$ represents a probability that a change type predicted by the to-be-trained neural network model is device rotation; $f(P_{MOV}, P_{ROTATE})$ represents a joint probability of simultaneous device movement and rotation, and may be understood as multiplying $P_{MOV}$ by $P_{ROTATE}$ or an expression for calculating a joint probability in another conventional technology; and Y represents the label carried by the training image in step S610. By using the loss subfunction shown in the formula (5), the probability that the change type predicted by the to-be-trained neural network model after performing a prediction task is simultaneous device movement and rotation, and a change amount that corresponds to simultaneous device movement and rotation and that is predicted by the to-be-trained neural network model after performing a quantization task, may be compared with the information carried in the label, being used as a basis for adjusting the parameter of the to-be-trained neural network model.

Step S640: Calculate a weighted sum of the plurality of loss subfunctions to obtain a total loss function.

The weighted sum of the loss subfunctions calculated in step S630 is calculated by using hyperparameters as weights, to obtain the total loss function. Refer to a formula (6).

$$L_{ALL}=\alpha_1 L_{ADD}+\alpha_2 L_{DEL}+\alpha_3 L_{MOV}+\alpha_4 L_{ROTATE}+\alpha_5 L_{MOV\_ROTATE} \quad (6)$$

In the formula (6), $L_{ADD}$ represents the loss subfunction corresponding to the preset change type of device addition; $L_{DEL}$ represents the loss subfunction corresponding to the preset change type of device deletion; $L_{MOV}$ represents the loss subfunction corresponding to the preset change type of device movement; $L_{ROTATE}$ represents the loss subfunction corresponding to the preset change type of device rotation; $L_{MOV\_ROTATE}$ represents the loss subfunction corresponding to the preset change type of simultaneous device movement and rotation; $\alpha_1$ to $\alpha_5$ represent the hyperparameters that are used as weighting coefficients and that correspond to the loss subfunctions; and $L_{ALL}$ represents the total loss function.

Step S650: Adjust the parameter of the neural network model by using the total loss function, to obtain the trained neural network model.

Based on an output of the total loss function obtained in step S640, the parameter of the neural network model may be adjusted by using a conventional algorithm of adjusting a neural network model, for example, a back propagation algorithm and a gradient descent algorithm, and further the trained neural network model is obtained after a plurality of iterative adjustments are performed.

In an implementation, the total loss function may further include another loss function that is calculated based on an area in which a device that changes is located in the training image, thereby optimizing a training effect.

In this way, with reference to the steps shown in FIG. 6, the total loss function is obtained by calculating the weighted sum of the plurality of loss subfunctions that are in a one-to-one correspondence with the plurality of preset change types, and then the parameter of the neural network model is adjusted by using the total loss function, to obtain the trained neural network model. A result output by the trained neural network model includes a change type of a device that changes and a change amount corresponding to the change type, facilitating fast recognition of a change type and outputting of a change amount.

Figure 7:
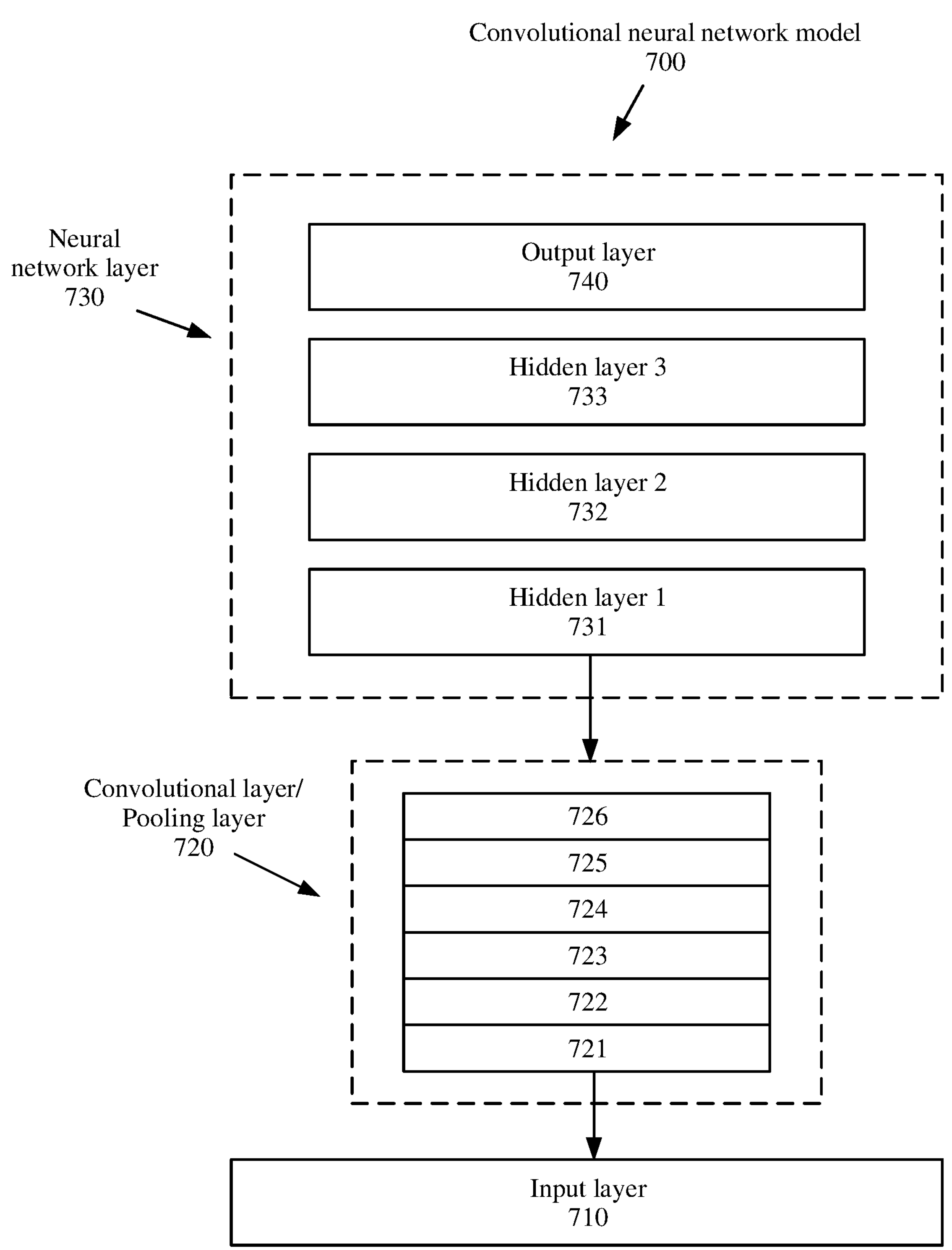
FIG. 7 is a diagram of a trained neural network model shown in FIG. 6 according to an embodiment of this application.

FIG. 7 is a diagram of a trained neural network model shown in FIG. 6 according to an embodiment of this application. It should be understood that FIG. 7 merely shows an example of a structure, which should not be understood as a unique structure. As shown in FIG. 7, a convolutional neural network model 700 may include an input layer 710, a convolutional layer/pooling layer 720, where the pooling layer is optional, and a neural network layer 730.

The following describes a structure of the convolutional layer/pooling layer 720 in detail.

As shown in FIG. 7, the convolutional layer/pooling layer 720 may include, as illustrated, layers 721 to 726. In an implementation, the layer 721 is a convolutional layer, the layer 722 is a pooling layer, the layer 723 is a convolutional layer, the layer 724 is a pooling layer, 725 is a convolutional layer, and 726 is a pooling layer. In another implementation, 721 and 722 are convolutional layers, 723 is a pooling layer, 724 and 725 are convolutional layers, and 726 is a pooling layer. That is, an output of a convolutional layer may be used as an input of a following pooling layer, or may be used as an input of another convolutional layer for continuing of a convolution operation.

The convolutional layer 721 is used as an example. The convolutional layer 721 may include many convolution operators. The convolution operator is also referred to as a kernel. A role of the convolution operator in image processing is equivalent to a filter that extracts information from an input image matrix. The convolution operator may essentially be a weight matrix. The weight matrix is usually predefined. In a process of performing a convolution operation on an image, the weight matrix usually processes pixels of an input image one by one (or two by two, depending on a value of a step) in a horizontal direction, to extract a feature from the image. A size of the weight matrix should be related to a size of the image. It should be noted that a depth dimension of the weight matrix is the same as a depth dimension of the input image. In a process of performing a convolution operation, the weight matrix extends to an entire depth of the input image. Therefore, after convolution with a single weight matrix is performed, a convolutional output in a single depth dimension is produced. However, in most cases, instead of using a single weight matrix, a plurality of weight matrices with a same dimension are applied. An output of each weight matrix is stacked to form a depth dimension of a convolutional image. Different weight matrices may be used to extract different features in an image. For example, a weight matrix is used to extract edge information of the image; another weight matrix is used to extract a color of the image; and still another weight matrix is used to blur unwanted noise in the image. The plurality of weight matrices have a same dimension. Feature maps extracted by the plurality of weight matrices with the same dimension also have a same dimension. Then, the plurality of extracted feature maps with the same dimension are combined to form an output of a convolution operation. In actual application, a lot of training needs to be performed to obtain weight values in these weight matrices. The weight matrices formed by using the weight values obtained through training may extract information from an input image, helping the convolutional neural network 700 to perform correct prediction.

When the convolutional neural network 700 has a plurality of convolutional layers, a relatively large quantity of general features are usually extracted at an initial convolutional layer (for example, 721). The general feature may also be referred to as a low-level feature. As a depth of the convolutional neural network 700 increases, a feature extracted at a subsequent convolutional layer (for example, 726) is more complex, for example, a high-level semantic feature. A feature with higher semantics is more applicable to a to-be-resolved problem.

Because a quantity of training parameters often needs to be reduced, a pooling layer often needs to be periodically introduced to follow a convolutional layer, that is, the layers 721 to 726 as illustrated in 720 in FIG. 7. It may be that one pooling layer follows one convolutional layer, or one or more pooling layers follow a plurality of convolutional layers. During image processing, the pooling layer is only used to reduce a space size of the image. The pooling layer may include an average pooling operator and/or a maximum pooling operator, to perform sampling on the input image to obtain an image with a relatively small size. The average pooling operator may calculate pixel values in an image in a range to produce an average value. The maximum pooling operator may be used to select a pixel with a maximum value in a range as a maximum pooling result. In addition, similar to that the size of the weight matrix at the convolutional layer needs to be related to the size of the image, an operator at the pooling layer also needs to be related to the size of the image. A size of a processed image output from the pooling layer may be less than a size of an image input to the pooling layer. Each pixel in the image output from the pooling layer represents an average value or a maximum value of a corresponding sub-region of the image input to the pooling layer.

The following describes a structure of the neural network layer 730 in detail.

After the convolutional layer/pooling layer 720 performs processing, the convolutional neural network 700 still cannot output required output information. This is because as described above, the convolutional layer/pooling layer 720 only extracts a feature and reduces a quantity of parameters brought by an input image. However, to generate final output information (required class information or other relevant information), the convolutional neural network 700 needs to use the neural network layer 730 for generating one or a group of outputs of a required class count. Therefore, the neural network layer 730 may include a plurality of hidden layers (731, 732, and 733 shown in FIG. 7) and an output layer 740. Parameters included in the plurality of hidden layers may be obtained through pre-training by using relevant training data of a task type. For example, the task type may include image recognition, image classification, super-resolution image reconstruction, and the like. It should be understood that the three hidden layers 1 to 3 shown in FIG. 7 are merely an example, and a different quantity of hidden layers may be included in another implementation.

A last layer of the entire convolutional neural network 700, namely, the output layer 740, follows the plurality of hidden layers in the neural network layer 730. The output layer 740 has a loss function similar to categorical cross-entropy. The loss function is used to calculate a prediction error. Once forward propagation (propagation from 710 to 740 shown in FIG. 7 is forward propagation) of the entire convolutional neural network 700 completes, back propagation (propagation from 740 to 710 shown in FIG. 7 is back propagation) starts to update the weight values and deviations of the layers mentioned above, to reduce a loss of the convolutional neural network 700 and an error between an ideal result and a result output by the convolutional neural network 700 by using the output layer. It should be noted that the convolutional neural network 700 shown in FIG. 7 is merely used as an example of a convolutional neural network, and in an application, the convolutional neural network may alternatively exist in a form of another network model.

Figure 8:
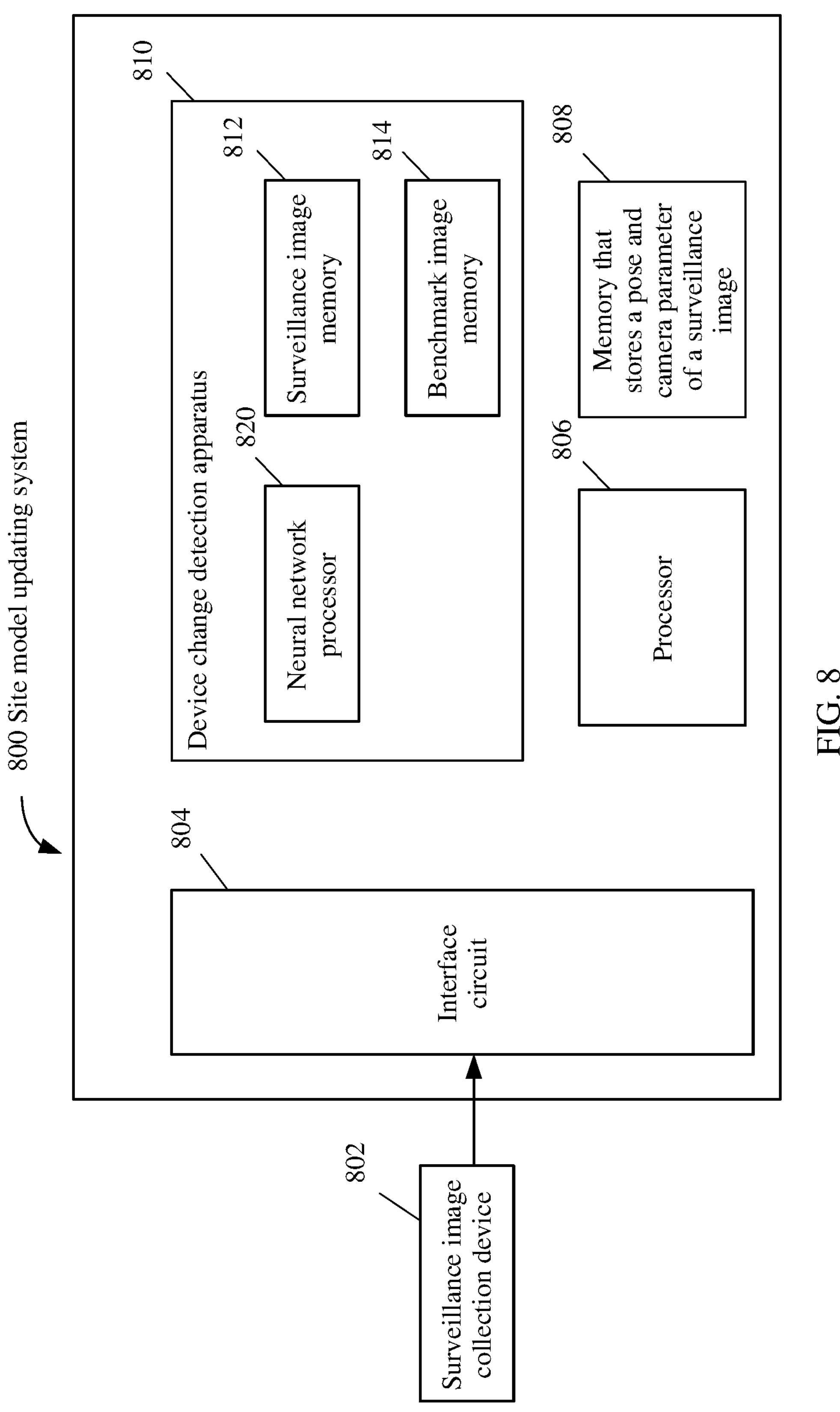
FIG. 8 is a diagram of a site model updating system according to an embodiment of this application.

FIG. 8 is a diagram of a site model updating system according to an embodiment of this application. As shown in FIG. 8, the site model updating system 800 includes an image collection device 802, an interface circuit 804, a device change detection apparatus 810, a processor 806, and a memory 808 that stores a pose and camera parameter of a surveillance image. The device change detection apparatus 810 further includes a neural network processor 820, a surveillance image memory 812, and a benchmark image memory 814. It should be understood that the device change detection apparatus 810 is configured to perform, for example, an operation of detecting a device change in step S306 shown in FIG. 3, that is, configured to perform the steps of the corresponding step S506 of detecting a device change shown in FIG. 5. The device change detection apparatus 810 includes the benchmark image memory 814 which is configured to store a benchmark image, also includes the surveillance image memory 812 which is configured to store a surveillance image, and further includes the neural network processor 820. The neural network processor 820 stores a neural network model or an equivalent machine learning algorithm, and is configured to perform step S516 of determining whether there is a device that changes and output an area in which the device that changes is located, a change type, and a corresponding change amount. The neural network model stored in the neural network processor 820 is obtained through training by using the neural network model training method shown in FIG. 6, and in an implementation, may have the structure of the convolutional neural network model 700 shown in FIG. 7.

Still with reference to FIG. 8, the image collection device 802 takes a surveillance image of a site in real time, and stores the surveillance image into the surveillance image memory 812 by using the interface circuit 804. When the device change detection apparatus 810 determines that there is a device that changes and outputs an area in which the device that changes is located, a change type, and a corresponding change amount, the processor 806 performs the operations in steps S308 to S330 shown in FIG. 3, including calculating a pose and camera parameter of the surveillance image. The processor 806 also performs the operation in step S310 of determining whether the area in which the device is located needs to be magnified. If the area in which the device is located needs to be magnified, the processor 806 indicates the image collection device 802 to collect a magnified surveillance image, then calculates a pose and camera parameter of the magnified surveillance image, and finally performs step S330 to update a site model.

Figure 9:
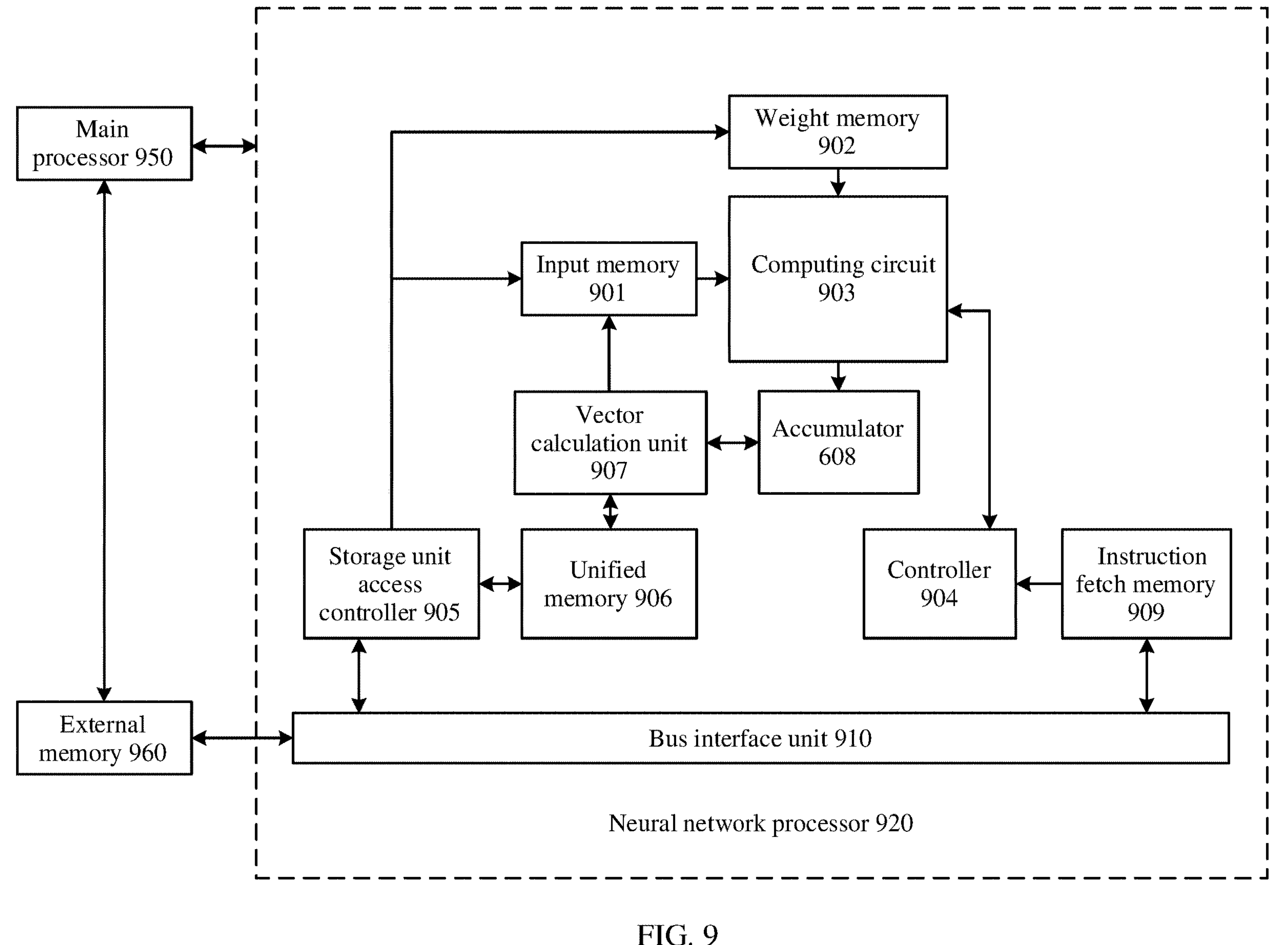
FIG. 9 is a diagram of a neural network processor shown in FIG. 8 according to an embodiment of this application.

FIG. 9 is a diagram of a neural network processor shown in FIG. 8 according to an embodiment of this application. As shown in FIG. 9, the neural network processor 920, an external memory 960, and a main processor 950 constitute an overall system architecture. Herein, the external memory 960 shown in FIG. 9 may include the memory 808 that stores a pose and camera parameter of a surveillance image shown in FIG. 8, and is an externally existing memory independent of the neural network processor 920. The main processor 950 shown in FIG. 9 may include the processor 806 shown in FIG. 8, and may be understood as a main processor configured to process another task other than a neural network algorithm. As shown in FIG. 9, a core part of the neural network processor 920 is a computing circuit 903. A controller 904 controls the computing circuit 903 to extract data from a memory (a weight memory or an input memory) and perform computation. In some implementations, the computing circuit 903 includes a plurality of processing units (Process Engine, PE). In some implementations, the computing circuit 903 is a two-dimensional pulsation array. The computing circuit 903 may alternatively be a one-dimensional pulsation array or another electronic circuit capable of performing mathematical operations such as multiplication and addition. In some implementations, the computing circuit 903 is a general-purpose matrix processor.

For example, it is assumed that there is an input matrix A, a weight matrix B, and an output matrix C. The computing circuit 903 fetches data corresponding to the matrix B from the weight memory 902, and buffers the data into each PE in the computing circuit 903. The computing circuit 903 fetches data of the matrix A from the input memory 901, performs a matrix operation with the matrix B, and stores an obtained partial result or final result of the matrices into an accumulator 908. A vector calculation unit 907 may further process an output of the computing circuit 903, such as vector multiplication, vector addition, an exponential operation, a logarithmic operation, and size comparison. For example, the vector calculation unit 907 may be used for network calculation at a non-convolutional/non-FC layer in a neural network, such as pooling, batch normalization, and local response normalization. In some implementations, the vector calculation unit 907 stores a processed output vector into a unified buffer 906. For example, the vector calculation unit 907 may apply a nonlinear function to an output of the computing circuit 903, for example, a vector of an accumulated value, to generate an activation value. In some implementations, the vector calculation unit 907 generates a normalized value, a combined value, or both. In some implementations, a processed output vector can be used as an activation input of the computing circuit 903, for example, for use in a subsequent layer in a neural network. Therefore, according to a requirement, a neural network algorithm run in the neural network processor shown in FIG. 8 may be executed by the computing circuit 903 or the vector calculation unit 907 shown in FIG. 9, or may be collaboratively executed by the two.

With reference to FIG. 9, the unified memory 906 is configured to store input data and output data. A storage unit access controller 905 (Direct Memory Access Controller, DMAC) moves input data in the external memory into the input memory 901 and/or the unified memory 906, stores weight data in the external memory into the weight memory 902, and stores data in the unified memory 906 into the external memory. A bus interface unit (BIU) 910 is configured to implement interaction between the main CPU, the DMAC, and an instruction fetch memory 909 by using a bus. The instruction fetch memory (instruction fetch buffer) 909 connected to the controller 904 is configured to store instructions used by the controller 904. The controller 904 is configured to invoke instructions buffered in the instruction fetch memory 909, to control a working process of a computing accelerator.

Generally, the unified memory 906, the input memory 901, the weight memory 902, and the instruction fetch memory 909 are all on-chip memories. The external memory is a memory outside of the NPU. The external memory may be a double data rate synchronous dynamic random access memory (DDR SDRAM for short), a high bandwidth memory (HBM), or another readable and writable memory.

The embodiments provided in this application may be implemented by using any one of hardware, software, firmware, or a solid-state logic circuit or a combination thereof, and may be implemented in combination with signal processing, control, and/or a dedicated circuit. The device or apparatus provided in the embodiments of this application may include one or more processors (for example, a microprocessor, a controller, a digital signal processor (DSP), an application-specific integrated circuit (ASIC), or a field programmable gate array (FPGA)). These processors process various computer-executable instructions to control an operation of the device or apparatus. The device or apparatus provided in the embodiments of this application may include a system bus or data transmission system that couples components together. The system bus may include any one or a combination of different bus structures, for example, a memory bus or memory controller, a peripheral bus, a universal serial bus, and/or a processor or local bus using any one of a plurality of bus architectures. The device or apparatus provided in the embodiments of this application may be separately provided, may be part of a system, or may be part of another device or apparatus.

The embodiments provided in this application may include a computer-readable storage medium or one or more storage devices that are used in combination with a computer-readable storage medium, for example, a device capable of providing non-transitory data storage. The computer-readable storage medium/storage device may be configured to store data, a programmer, and/or instructions. When these data, programmers, and/or instructions are executed by a processor in the device or apparatus provided in the embodiments of this application, these devices or apparatuses are enabled to implement relevant operations. The computer-readable storage medium/storage device may include one or more of the following characteristics: volatile, nonvolatile, dynamic, static, readable/writable, read-only, random access, sequential access, location addressable, file addressable, and content addressable. In one or more example embodiments, the computer-readable storage medium/storage device may be integrated into the device or apparatus provided in the embodiments of this application, or may belong to a common system. The computer-readable storage medium/storage device may include an optical storage device, a semiconductor storage device, a magnetic storage device, and/or the like, or may include a random access memory (RAM), a flash memory, a read-only memory (ROM), an erasable programmable read-only memory (EPROM), an electrically erasable programmable read-only memory (EEPROM), a register, a hard disk, a removable disk, a recordable and/or rewritable compact disk (CD), a digital versatile disc (DVD), a mass storage medium device, or an appropriate storage medium in any other form.

The foregoing are implementations of embodiments of this application. It should be noted that the steps in the methods described in the embodiments of this application may be sequentially adjusted, combined, and deleted, according to an actual requirement. In the foregoing embodiments, the descriptions of each embodiment have respective focuses. For a part that is not described in detail in an embodiment, refer to related descriptions in other embodiments. It may be understood that the structures shown in embodiments of this application and the accompanying drawings do not constitute limitations on a related apparatus or related systems. In some other embodiments of this application, the related apparatus or system may include more or fewer components than those in the embodiments and the accompanying drawings, or combine some components, or split some components, or have different component arrangements. Persons skilled in the art understand that without departing from the spirit and scope of the embodiments of this application, they may make various modifications or changes to arrangements, operations, and details of the methods and devices described in the embodiments; and without departing from principles of embodiments of this application, they may also make several improvements and refinements, and these improvements and refinements are also considered to be within the protection scope of this application.

What is claimed is:

1. A site model updating method, the method comprising:

obtaining a surveillance image and determining, based on the surveillance image, a change type of a device that changes in the surveillance image and a change amount corresponding to the change type;

calculating a pose of the device and a camera parameter of the device for the surveillance image based on the surveillance image and a site model;

determining, based on the pose of the device and the camera parameter of the device for the surveillance image, a pose of the device that changes in the surveillance image; and updating the site model based on the pose of the device that changes in the surveillance image, the change type, and the change amount corresponding to the change type.

2. The method according to claim 1, wherein the determining, based on the surveillance image, the change type of the device that changes in the surveillance image and the change amount corresponding to the change type comprises:

inputting the surveillance image into a neural network model to determine the change type of the device that changes in the surveillance image and the change amount corresponding to the change type, wherein the change type is one of a plurality of preset change types.

3. The method according to claim 2, wherein the neural network model is obtained through training using a loss function, wherein:

the loss function comprises a weighted sum of a plurality of loss subfunctions;

the plurality of loss subfunctions are in a one-to-one correspondence with the plurality of preset change types; and each of the plurality of loss subfunctions is determined based on a change amount corresponding to a preset change type that corresponds to the loss subfunction.

4. The method according to claim 2, wherein the plurality of preset change types includes a device addition, wherein a device model corresponding to the device needs to be added to the area in which the device that changes is located and the site model needs to be updated, and a device addition change amount corresponding to the device addition comprises a maximum value of pixel dimensions of the surveillance image, wherein the device addition change amount is added to the maximum value of pixel dimensions of the surveillance image.

5. The method according to claim 2, wherein the plurality of preset change types includes a device deletion, wherein a device model corresponding to the device needs to be deleted from the site model, and a device deletion change amount corresponding to the device deletion comprises a negative value of a maximum value of pixel dimensions of the surveillance image, wherein the device deletion change amount is removed from the maximum value of pixel dimensions of the surveillance image.

6. The method according to claim 2, wherein the plurality of preset change types includes a device movement, and a device movement change amount corresponding to the device movement comprises a moving distance of a center point of the device that changes in the surveillance image.

7. The method according to claim 2, wherein the plurality of preset change types includes a device rotation, and a device rotation change amount corresponding to the device rotation comprises a turning distance of a connection line between an edge and a center point of the device that changes in the surveillance image.

8. The method according to claim 2, wherein the plurality of preset change types includes a simultaneous device movement and rotation, and a simultaneous device movement and rotation change amount corresponding to the simultaneous device movement and rotation comprises a moving distance of a center point of the device that changes in the surveillance image and a turning distance of a connection line between an edge and the center point of the device that changes in the surveillance image.

9. The method according to claim 1, wherein the method further comprises:

determining a proportion of an area in which the device that changes in the surveillance image is located in the surveillance image;

comparing the proportion with a preset proportion;

obtaining a magnified surveillance image when the proportion is less than the preset proportion;

calculating a magnified image pose and a magnified image camera parameter of the magnified surveillance image based on the magnified surveillance image and the site model; and updating the site model based on the magnified image pose and the magnified image camera parameter of the magnified surveillance image.

10. The method according to claim 9, wherein the magnified surveillance image is obtained based on a magnification factor, wherein the magnification factor is determined based on the proportion and the preset proportion.

11. The method according to claim 10, wherein the magnified image pose and the magnified image camera parameter of the magnified surveillance image are determined based on the magnification factor and the pose and the camera parameter of the surveillance image.

12. An apparatus, comprising:

an interface;

a memory storing instructions; and at least one processor in communication with the interface and the memory, the at least one processor configured, upon execution of the instructions, to perform the following steps:

obtain a surveillance image and determine, based on the surveillance image, a change type of a device that changes in the surveillance image and a change amount corresponding to the change type;

calculate a pose of the device and a camera parameter of the device for the surveillance image based on the surveillance image and a site model;

determine, based on the pose of the device and the camera parameter of the device for the surveillance image, a pose of the device that changes in the surveillance image; and update the site model based on the pose of the device that changes in the surveillance image, the change type, and the change amount corresponding to the change type.

13. A site model updating system, the system comprising:

a device change detection apparatus configured to determine a change type of a device that changes in the surveillance image and a change amount corresponding to the change type, based on a surveillance image; and a processor configured to:

obtain the surveillance image;

calculate a pose of the device and a camera parameter of the device for the surveillance image based on the surveillance image and a site model;

determine, based on the pose of the device and the camera parameter of the device for the surveillance image, a pose of the device that changes in the surveillance image; and update the site model based on the pose of the device that changes in the surveillance image, the change type, and the change amount corresponding to the change type.

14. The system according to claim 13, wherein the device change detection apparatus stores a neural network model and inputs the surveillance image into the neural network model to determine the change type of the device that changes in the surveillance image and the change amount corresponding to the change type, wherein the change type is one of a plurality of preset change types.

15. The system according to claim 14, wherein the neural network model is obtained through training using a loss function, wherein:

the loss function comprises a weighted sum of a plurality of loss subfunctions;

the plurality of loss subfunctions are in a one-to-one correspondence with the plurality of preset change types; and each of the plurality of loss subfunctions is determined based on a change amount corresponding to a preset change type that corresponds to the loss subfunction.

16. The system according to claim 14, wherein the plurality of preset change types includes a device addition, wherein a device model corresponding to the device needs to be added to the area in which the device that changes is located and the site model needs to be updated, and a device addition change amount corresponding to the device addition comprises a maximum value of pixel dimensions of the surveillance image, wherein the device addition change amount is added to the maximum value of pixel dimensions of the surveillance image.

17. The system according to claim 14, wherein the plurality of preset change types includes a device deletion, wherein a device model corresponding to the device needs to be deleted from the site model, and a device deletion change amount corresponding to the device deletion comprises a negative value of a maximum value of pixel dimensions of the surveillance image, wherein the device deletion change amount is removed from the maximum value of pixel dimensions of the surveillance image.

18. The system according to claim 14, wherein the plurality of preset change types includes a device movement, and a device movement change amount corresponding to the device movement comprises a moving distance of a center point of the device that changes in the surveillance image.

19. The system according to claim 14, wherein the plurality of preset change types includes a device rotation, and a device rotation change amount corresponding to the device rotation comprises a turning distance of a connection line between an edge and a center point of the device that changes in the surveillance image.

20. The system according to claim 14, wherein the plurality of preset change types includes a simultaneous device movement and rotation, and a simultaneous device movement and rotation change amount corresponding to the simultaneous device movement and rotation comprises a moving distance of a center point of the device that changes in the surveillance image and a turning distance of a connection line between an edge and the center point of the device that changes in the surveillance image.

* * * * *